(12) United States Patent
Breen et al.

(10) Patent No.: US 7,739,167 B2
(45) Date of Patent: Jun. 15, 2010

(54) AUTOMATED MANAGEMENT OF AIRPORT REVENUES

(75) Inventors: Thomas J. Breen, Tyngsboro, MA (US); Alexander E. Smith, McLean, VA (US)

(73) Assignee: ERA Systems Corporation, Reston, VA (US)

( * ) Notice: Subject to any disclaimer, the term of this patent is extended or adjusted under 35 U.S.C. 154(b) by 1045 days.

(21) Appl. No.: 11/203,823

(22) Filed: Aug. 15, 2005

(65) Prior Publication Data

US 2006/0085236 A1    Apr. 20, 2006

Related U.S. Application Data

(63) Continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, said application No. 10/743,042 is a continuation-in-part of application No. 10/319,725, filed on Dec. 16, 2002, now Pat. No. 6,812,890, application No. 11/203,823, which is a continuation-in-part of application No. 11/031,457, filed on Jan. 7, 2005, which is a continuation-in-part of application No. 10/638,524, which is a continuation of application No. 09/516,215, and a continuation-in-part of application No. 10/319,725, application No. 11/203,823, which is a continuation-in-part of application No. 10/756,799, filed on Jan. 14, 2004, which is a continuation-in-part of application No. 10/638,524, which is a continuation of application No. 09/516,215, and a continuation-in-part of application No. 10/319,725, and a continuation-in-part of application No. 10/751,118, filed on Dec. 16, 2002.

(60) Provisional application No. 60/440,618, filed on Jan. 17, 2003, provisional application No. 60/343,237, filed on Dec. 31, 2001, provisional application No. 60/123,170, filed on Mar. 5, 1999.

(51) Int. Cl.
*G06Q 40/00* (2006.01)
(52) U.S. Cl. .............................. 705/35; 705/9; 342/454
(58) Field of Classification Search .................. 705/35, 705/9; 342/52, 454
See application file for complete search history.

(56) References Cited

U.S. PATENT DOCUMENTS 1,738,571 A   12/1929  Gare ........................... 404/18

(Continued)

*Primary Examiner*—Charles R Kyle
*Assistant Examiner*—Samica L Norman
(74) *Attorney, Agent, or Firm*—Robert Platt Bell

(57) ABSTRACT

A solution is described which provides an airport with the tools to accurately manage all sources of airside revenues, including operational revenues and capital programs. The system of the present invention relies on the acquisition of any and all data related to the operations, property, lease, and revenue management of an airport, including aircraft tracking data. This data is then stored in a central database where it is processed, sorted, and stored for later retrieval. The data may exist in a number of forms including real-time streams, tabular, or in the form of a database. From this data, airport revenue information can be accurately managed.

20 Claims, 7 Drawing Sheets

U.S. PATENT DOCUMENTS

| | | | |
|---|---|---|---|
| 3,668,403 A | 6/1972 | Meilander | 701/121 |
| 3,705,404 A | 12/1972 | Chisholm | 343/112 R |
| 3,792,472 A | 2/1974 | Payne et al. | 342/32 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A | 2/1987 | Bateman | 701/301 |
| 4,688,046 A | 8/1987 | Schwab | 342/456 |
| 4,782,450 A | 11/1988 | Flax | 364/461 |
| 4,811,308 A | 3/1989 | Michel | 367/136 |
| 4,843,397 A | 6/1989 | Galati et al. | 342/59 |
| 4,853,700 A | 8/1989 | Funatsu et al. | 342/30 |
| 4,897,661 A | 1/1990 | Hiraiwa | 342/457 |
| 4,899,296 A | 2/1990 | Khattak | 702/40 |
| 4,910,526 A | 3/1990 | Donnangelo et al. | 342/455 |
| 4,914,733 A | 4/1990 | Gralnick | 340/961 |
| 4,958,306 A | 9/1990 | Powell et al. | 702/40 |
| 5,001,490 A | 3/1991 | Fichtner | 342/195 |
| 5,001,650 A | 3/1991 | Francis et al. | 364/516 |
| 5,017,930 A | 5/1991 | Stoltz | 342/465 |
| 5,025,382 A | 6/1991 | Artz | 364/439 |
| 5,027,114 A | 6/1991 | Kawashima et al. | 340/941 |
| 5,045,861 A | 9/1991 | Duffett-Smith | 342/457 |
| 5,075,680 A * | 12/1991 | Dabbs | 342/52 |
| 5,075,694 A | 12/1991 | Donnangelo et al. | 342/455 |
| 5,081,457 A | 1/1992 | Motisher et al. | 342/40 |
| 5,089,822 A | 2/1992 | Abaunza et al. | 342/30 |
| 5,113,193 A | 5/1992 | Powell et al. | 342/25 |
| 5,119,102 A | 6/1992 | Barnard | 342/357 |
| 5,132,695 A | 7/1992 | Sumas et al. | 342/461 |
| 5,138,321 A | 8/1992 | Hammer | 342/36 |
| 5,144,315 A | 9/1992 | Schwab et al. | 342/49 |
| 5,153,836 A | 10/1992 | Fraughton et al. | 364/461 |
| 5,179,384 A | 1/1993 | De Haan | 342/37 |
| 5,191,342 A | 3/1993 | Alsup et al. | 342/465 |
| 5,200,902 A | 4/1993 | Pilley | 364/439 |
| 5,225,842 A | 7/1993 | Brown et al. | 342/357 |
| 5,260,702 A | 11/1993 | Thompson | 340/970 |
| 5,262,784 A | 11/1993 | Drobnicki et al. | 342/45 |
| 5,265,023 A | 11/1993 | Sokkappa | 364/439 |
| 5,268,698 A | 12/1993 | Smith et al. | 342/450 |
| 5,283,574 A | 2/1994 | Grove | 340/970 |
| 5,311,194 A | 5/1994 | Brown | 342/357 |
| 5,317,316 A | 5/1994 | Sturm et al. | 342/30 |
| 5,317,317 A | 5/1994 | Billaud et al. | 342/40 |
| 5,339,281 A | 8/1994 | Narendra et al. | 367/5 |
| 5,341,139 A | 8/1994 | Billaud et al. | 342/40 |
| 5,365,516 A | 11/1994 | Jandrell | 370/18 |
| 5,374,932 A | 12/1994 | Wyschogrod et al. | 342/36 |
| 5,379,224 A | 1/1995 | Brown et al. | 364/449 |
| 5,381,140 A | 1/1995 | Kuroda et al. | 340/961 |
| 5,402,116 A | 3/1995 | Ashley | 340/870.1 |
| 5,406,288 A | 4/1995 | Billaud et al. | 342/37 |
| 5,424,746 A | 6/1995 | Schwab et al. | 342/49 |
| 5,424,748 A | 6/1995 | Pourailly et al. | 342/157 |
| 5,438,337 A | 8/1995 | Aguado | 342/357 |
| 5,448,233 A | 9/1995 | Saban et al. | 340/963 |
| 5,450,329 A | 9/1995 | Tanner | 364/449 |
| 5,454,720 A | 10/1995 | FitzGerald et al. | 434/27 |
| 5,455,586 A | 10/1995 | Barbier et al. | 342/37 |
| 5,471,657 A | 11/1995 | Gharpuray | 455/12.1 |
| 5,486,829 A | 1/1996 | Potier et al. | 342/40 |
| 5,493,309 A | 2/1996 | Bjornholt | 342/455 |
| 5,506,590 A | 4/1996 | Minter | 342/462 |
| 5,515,286 A | 5/1996 | Simon | 364/461 |
| 5,528,244 A | 6/1996 | Schwab | 342/37 |
| 5,534,871 A | 7/1996 | Hidaka et al. | 342/113 |
| 5,541,608 A | 7/1996 | Murphy et al. | 342/442 |
| 5,570,095 A | 10/1996 | Drouilhet, Jr. et al. | 342/357 |
| 5,570,099 A | 10/1996 | DesJardins | 342/378 |
| 5,583,775 A | 12/1996 | Nobe et al. | 364/449.7 |
| 5,590,044 A | 12/1996 | Buckreub | 364/453 |
| 5,596,326 A | 1/1997 | Fitts | 342/30 |
| 5,596,332 A | 1/1997 | Coles et al. | 342/455 |
| 5,608,412 A | 3/1997 | Welles, II et al. | 342/457 |
| 5,614,912 A | 3/1997 | Mitchell | 342/146 |
| 5,617,101 A | 4/1997 | Maine et al. | 342/358 |
| 5,627,546 A | 5/1997 | Crow | 342/352 |
| 5,629,691 A | 5/1997 | Jain | 340/961 |
| 5,635,693 A | 6/1997 | Benson et al. | 235/384 |
| 5,659,319 A | 8/1997 | Rost et al. | 342/36 |
| 5,666,110 A | 9/1997 | Paterson | 340/970 |
| 5,670,960 A | 9/1997 | Cessat | 342/25 |
| 5,670,961 A | 9/1997 | Tomita et al. | 342/36 |
| 5,677,841 A | 10/1997 | Shiomi et al. | 365/439 |
| 5,680,140 A | 10/1997 | Loomis | 342/357 |
| 5,686,921 A | 11/1997 | Okada et al. | 342/127 |
| 5,694,322 A | 12/1997 | Westerlage et al. | 364/464.27 |
| 5,714,948 A | 2/1998 | Farmakis et al. | 340/961 |
| 5,732,384 A | 3/1998 | Ellert et al. | 701/120 |
| 5,752,216 A | 5/1998 | Carlson et al. | 701/120 |
| 5,757,314 A | 5/1998 | Gounon et al. | 342/357 |
| 5,774,829 A | 6/1998 | Cisneros et al. | 701/213 |
| 5,781,150 A | 7/1998 | Norris | 342/357 |
| 5,784,022 A | 7/1998 | Kupfer | 342/80 |
| 5,793,329 A | 8/1998 | Nakada et al. | 342/357 |
| 5,798,712 A | 8/1998 | Coquin | 340/970 |
| 5,802,542 A | 9/1998 | Coiera et al. | 711/4 |
| 5,825,021 A | 10/1998 | Uemura | 250/222.1 |
| 5,828,333 A | 10/1998 | Richardson et al. | 342/70 |
| 5,839,080 A | 11/1998 | Muller | 701/9 |
| 5,841,391 A | 11/1998 | Lucas, Jr. et al. | 342/34 |
| 5,841,398 A | 11/1998 | Brock | 342/357 |
| 5,850,420 A | 12/1998 | Guillard et al. | 375/316 |
| 5,867,804 A | 2/1999 | Pilley et al. | 701/120 |
| 5,872,526 A | 2/1999 | Tognazzini | 340/961 |
| 5,884,222 A | 3/1999 | Denoize et al. | 701/301 |
| 5,890,068 A | 3/1999 | Fattouce et al. | 455/456.2 |
| 5,892,462 A | 4/1999 | Tran | 340/961 |
| 5,913,912 A | 6/1999 | Nishimura et al. | 701/35 |
| 5,920,277 A | 7/1999 | Foster et al. | 342/32 |
| 5,920,318 A | 7/1999 | Salvatore, Jr. et al. | 345/418 |
| 5,923,293 A | 7/1999 | Smith et al. | 342/455 |
| 5,949,375 A | 9/1999 | Ishiguro et al. | 342/457 |
| 5,969,674 A | 10/1999 | von der Embse et al. | 342/357.16 |
| 5,977,905 A | 11/1999 | Le Chevalier | 342/163 |
| 5,979,234 A | 11/1999 | Karlsen | 73/170.13 |
| 5,990,833 A | 11/1999 | Ahlbom et al. | 342/417 |
| 5,991,687 A | 11/1999 | Hale et al. | 701/207 |
| 5,995,040 A | 11/1999 | Issler et al. | 342/352 |
| 5,999,116 A | 12/1999 | Evers | 342/36 |
| 6,043,777 A | 3/2000 | Bergman et al. | 342/357 |
| 6,044,322 A | 3/2000 | Stieler | 701/120 |
| 6,049,304 A | 4/2000 | Rudel et al. | 342/357.08 |
| 6,049,754 A | 4/2000 | Beaton et al. | 701/204 |
| 6,075,479 A | 6/2000 | Kudoh | 342/70 |
| 6,081,222 A | 6/2000 | Henkel et al. | 342/45 |
| 6,081,764 A | 6/2000 | Varon | 701/120 |
| 6,085,150 A | 7/2000 | Henry et al. | 701/301 |
| 6,088,634 A | 7/2000 | Muller | 701/9 |
| 6,092,009 A | 7/2000 | Glover | 701/14 |
| 6,094,169 A | 7/2000 | Smith et al. | 342/465 |
| 6,122,570 A | 9/2000 | Muller | 701/9 |

| Patent | Kind | Date | Inventor | Class |
|---|---|---|---|---|
| 6,127,944 | A | 10/2000 | Daly | 340/963 |
| 6,133,867 | A | 10/2000 | Eberwine et al. | 342/29 |
| 6,138,060 | A | 10/2000 | Conner | 701/9 |
| 6,147,748 | A | 11/2000 | Hughes | 356/4.09 |
| 6,161,097 | A | 12/2000 | Glass et al. | 705/6 |
| 6,178,363 | B1 | 1/2001 | McIntyre et al. | 701/16 |
| 6,188,937 | B1 | 2/2001 | Sherry et al. | 701/14 |
| 6,195,040 | B1 | 2/2001 | Arethens | 342/357.12 |
| 6,195,609 | B1 | 2/2001 | Pilley | 701/120 |
| 6,201,499 | B1 | 3/2001 | Hawkes et al. | 342/387 |
| 6,208,284 | B1 | 3/2001 | Woodell et al. | 342/30 |
| 6,208,937 | B1 | 3/2001 | Huddle | 701/221 |
| 6,211,811 | B1 | 4/2001 | Evers | 342/36 |
| 6,219,592 | B1 | 4/2001 | Muller et al. | 701/9 |
| 6,222,480 | B1 | 4/2001 | Kuntman et al. | 342/30 |
| 6,225,942 | B1 | 5/2001 | Alon | 342/59 |
| 6,230,018 | B1 | 5/2001 | Watters et al. | 455/456 |
| 6,233,522 | B1 | 5/2001 | Morici | 701/208 |
| 6,239,739 | B1 | 5/2001 | Thomson et al. | 342/96 |
| 6,240,345 | B1 | 5/2001 | Vesel | 701/31 |
| 6,246,342 | B1 | 6/2001 | Vandevoorde et al. | 340/961 |
| 6,253,147 | B1 | 6/2001 | Greenstein | 701/202 |
| 6,271,768 | B1 | 8/2001 | Frazier, Jr. et al. | 340/961 |
| 6,275,172 | B1 | 8/2001 | Curtis et al. | 340/961 |
| 6,275,767 | B1 | 8/2001 | Delseny et al. | 701/120 |
| 6,282,487 | B1 | 8/2001 | Shiomi et al. | 701/120 |
| 6,282,488 | B1 | 8/2001 | Castor et al. | 701/120 |
| 6,289,280 | B1 | 9/2001 | Fernandez-Corbaton | 701/214 |
| 6,292,721 | B1 | 9/2001 | Conner et al. | 701/9 |
| 6,311,127 | B1 | 10/2001 | Stratton et al. | 701/213 |
| 6,314,361 | B1 | 11/2001 | Yu et al. | 701/120 |
| 6,314,363 | B1 | 11/2001 | Pilley et al. | 701/120 |
| 6,317,663 | B1 | 11/2001 | Meunier et al. | 701/16 |
| 6,321,091 | B1 | 11/2001 | Holland | 455/456 |
| 6,327,471 | B1 | 12/2001 | Song | 455/440 |
| 6,329,947 | B2 | 12/2001 | Smith | 342/418 |
| 6,337,652 | B1 | 1/2002 | Shiomi et al. | 342/37 |
| 6,338,011 | B1 | 1/2002 | Furst et al. | 701/1 |
| 6,339,745 | B1 | 1/2002 | Novik | 701/208 |
| 6,340,935 | B1 | 1/2002 | Hall | 340/932.2 |
| 6,340,947 | B1 | 1/2002 | Chang et al. | 342/357.01 |
| 6,344,820 | B1 | 2/2002 | Shiomi et al. | 342/174 |
| 6,347,263 | B1 | 2/2002 | Johnson et al. | 701/14 |
| 6,348,856 | B1 | 2/2002 | Jones et al. | 340/10.1 |
| 6,366,240 | B1 | 4/2002 | Timothy et al. | 342/417 |
| 6,377,208 | B2 | 4/2002 | Chang et al. | 342/357.01 |
| 6,380,869 | B1 | 4/2002 | Simon et al. | 340/945 |
| 6,380,870 | B1 | 4/2002 | Conner et al. | 340/970 |
| 6,384,783 | B1 | 5/2002 | Smith et al. | 342/387 |
| 6,393,359 | B1 | 5/2002 | Flynn et al. | 701/120 |
| 6,396,435 | B1 | 5/2002 | Fleischhauer et al. | 342/70 |
| 6,408,233 | B1 | 6/2002 | Solomon et al. | 701/35 |
| 6,414,629 | B1 | 7/2002 | Curcio | 342/357.08 |
| 6,415,219 | B1 | 7/2002 | Degodyuk | 70/117 |
| 6,420,993 | B1 | 7/2002 | Varon | 342/36 |
| 6,445,310 | B1 | 9/2002 | Bateman et al. | 340/970 |
| 6,445,927 | B1 | 9/2002 | Kng et al. | 455/456 |
| 6,448,929 | B1 | 9/2002 | Smith et al. | 342/456 |
| 6,459,411 | B2 | 10/2002 | Frazier et al. | 342/455 |
| 6,462,674 | B2 | 10/2002 | Ohmura et al. | 340/901 |
| 6,463,383 | B1 | 10/2002 | Baiada et al. | 701/120 |
| 6,469,654 | B1 | 10/2002 | Winner et al. | 342/33 |
| 6,469,655 | B1 | 10/2002 | Franke et al. | 342/36 |
| 6,469,664 | B1 | 10/2002 | Michaelson et al. | 342/357.13 |
| 6,473,027 | B1 | 10/2002 | Alon | 342/37 |
| 6,473,694 | B1 | 10/2002 | Akopian et al. | 701/213 |
| 6,477,449 | B1 | 11/2002 | Conner et al. | 701/4 |
| 6,492,932 | B1 | 12/2002 | Jin et al. | 342/25 |
| 6,493,610 | B1 | 12/2002 | Ezaki | 701/3 |
| 6,504,490 | B2 | 1/2003 | Mizushima | 340/943 |
| 6,518,916 | B1 | 2/2003 | Ashihara et al. | 342/70 |
| 6,522,295 | B2 | 2/2003 | Baugh et al. | 342/453 |
| 6,531,978 | B2 | 3/2003 | Tran | 342/29 |
| 6,542,809 | B2 | 4/2003 | Hehls, III | 701/120 |
| 6,542,810 | B2 | 4/2003 | Lai | 701/120 |
| 6,545,631 | B2 | 4/2003 | Hudson et al. | 342/30 |
| 6,549,829 | B1 | 4/2003 | Anderson et al. | 701/16 |
| 6,563,432 | B1 | 5/2003 | Millgard | 340/961 |
| 6,567,043 | B2 | 5/2003 | Smith et al. | 342/450 |
| 6,571,155 | B2 | 5/2003 | Carriker et al. | 701/3 |
| 6,584,400 | B2 | 6/2003 | Beardsworth | 701/120 |
| 6,584,414 | B2 | 6/2003 | Green et al. | 702/33 |
| 6,587,079 | B1 | 7/2003 | Rickard et al. | 342/387 |
| 6,606,034 | B1 | 8/2003 | Muller et al. | 340/970 |
| 6,606,563 | B2 | 8/2003 | Corcoran, III | 701/301 |
| 6,615,648 | B1 | 9/2003 | Ferguson et al. | 73/146 |
| 6,617,997 | B2 | 9/2003 | Ybarra et al. | 342/29 |
| 6,618,008 | B1 | 9/2003 | Scholz | 342/427 |
| 6,633,259 | B1 | 10/2003 | Smith et al. | 342/456 |
| 6,657,578 | B2 | 12/2003 | Stayton | 342/30 |
| 6,680,687 | B2 | 1/2004 | Phelipot | 342/29 |
| 6,690,295 | B1 | 2/2004 | De Boer | 340/951 |
| 6,690,618 | B2 | 2/2004 | Tomasi et al. | 367/127 |
| 6,691,004 | B2 | 2/2004 | Johnson | 701/14 |
| 6,707,394 | B2 | 3/2004 | Ishihara et al. | 340/970 |
| 6,710,719 | B1 | 3/2004 | Jones et al. | 340/825.49 |
| 6,710,723 | B2 | 3/2004 | Muller | 340/970 |
| 6,714,782 | B1 | 3/2004 | Monot et al. | 455/431 |
| 6,721,652 | B1 | 4/2004 | Sanqunetti | 701/207 |
| 6,744,396 | B2 | 6/2004 | Stone et al. | 342/36 |
| 6,750,815 | B2 | 6/2004 | Michaelson et al. | 342/357.13 |
| 6,751,545 | B2 | 6/2004 | Walter | 701/120 |
| 6,760,387 | B2 | 7/2004 | Langford et al. | 375/267 |
| 6,765,533 | B2 | 7/2004 | Szajnowski | 342/465 |
| 6,789,011 | B2 | 9/2004 | Baiada et al. | 701/120 |
| 6,789,016 | B2 | 9/2004 | Bayh et al. | 701/301 |
| 6,792,058 | B1 | 9/2004 | Hershey et al. | 375/347 |
| 6,798,381 | B2 | 9/2004 | Benner et al. | 342/450 |
| 6,799,114 | B2 | 9/2004 | Etnyre | 701/120 |
| 6,801,152 | B1 | 10/2004 | Rose | 342/13 |
| 6,801,155 | B2 | 10/2004 | Jahangir et al. | 342/90 |
| 6,809,679 | B2 | 10/2004 | LaFrey et al. | 342/37 |
| 6,810,329 | B2 | 10/2004 | Koga | 701/211 |
| 6,812,890 | B2 * | 11/2004 | Smith et al. | 342/454 |
| 6,816,105 | B2 | 11/2004 | Winner et al. | 342/37 |
| 6,819,282 | B1 | 11/2004 | Galati et al. | 342/37 |
| 6,823,188 | B1 | 11/2004 | Stern | 455/456.1 |
| 6,828,921 | B2 | 12/2004 | Brown et al. | 340/945 |
| 6,845,362 | B2 | 1/2005 | Furuta et al. | 705/13 |
| 6,861,982 | B2 | 3/2005 | Forstrom et al. | 342/387 |
| 6,862,519 | B2 | 3/2005 | Walter | 701/120 |
| 6,862,541 | B2 | 3/2005 | Mizushima | 702/26 |
| 6,865,484 | B2 | 3/2005 | Miyasaka et al. | 701/213 |
| 6,873,269 | B2 | 3/2005 | Tran | 340/961 |
| 6,873,903 | B2 | 3/2005 | Baiada et al. | 701/120 |
| 6,876,859 | B2 | 4/2005 | Anderson et al. | 455/456.1 |
| 6,882,930 | B2 | 4/2005 | Trayford et al. | 701/117 |
| 6,885,340 | B2 | 4/2005 | Smith et al. | 342/465 |
| 6,900,760 | B2 | 5/2005 | Groves | 342/357.14 |
| 6,912,461 | B2 | 6/2005 | Poreda | 701/120 |
| 6,927,701 | B2 | 8/2005 | Schmidt et al. | 340/959 |
| 6,930,638 | B2 | 8/2005 | Lloyd et al. | 342/453 |
| 6,952,631 | B2 | 10/2005 | Griffith et al. | 701/13 |
| 6,963,304 | B2 | 11/2005 | Murphy | 342/357.02 |
| 6,967,616 | B2 | 11/2005 | Etnyre | 342/182 |
| 6,977,612 | B1 | 12/2005 | Bennett | 342/357.07 |
| 6,985,103 | B2 | 1/2006 | Ridderheim et al. | 342/30 |
| 6,985,743 | B2 | 1/2006 | Bajikar | 455/456.1 |
| 6,992,626 | B2 | 1/2006 | Smith | 342/454 |
| 7,006,032 | B2 | 2/2006 | King et al. | 342/29 |
| 7,012,552 | B2 | 3/2006 | Baugh et al. | 340/945 |
| 7,026,987 | B2 | 4/2006 | Lokshin et al. | 342/357.12 |
| 7,030,780 | B2 | 4/2006 | Shiomi et al. | 340/961 |
| 7,043,355 | B2 | 5/2006 | Lai | 701/120 |
| 7,050,909 | B2 | 5/2006 | Nichols et al. | 701/301 |
| 7,053,792 | B2 | 5/2006 | Aoki et al. | 340/928 |

| Patent/Pub No. | Date | Inventor | Class |
|---|---|---|---|
| 7,058,506 B2 | 6/2006 | Kawase et al. | 701/201 |
| 7,062,381 B1 | 6/2006 | Rekow et al. | 701/300 |
| 7,065,443 B2 | 6/2006 | Flynn et al. | 701/120 |
| 7,071,843 B2 | 7/2006 | Hashida et al. | 340/995.12 |
| 7,071,867 B2 | 7/2006 | Wittenberg et al. | 342/70 |
| 7,079,925 B2 | 7/2006 | Kubota et al. | 701/1 |
| 7,095,360 B2 | 8/2006 | Kuji et al. | 342/29 |
| 7,102,570 B2 | 9/2006 | Bar-On et al. | 342/465 |
| 7,106,212 B2 | 9/2006 | Konishi et al. | 340/905 |
| 7,109,889 B2 | 9/2006 | He | 340/971 |
| 7,117,089 B2 | 10/2006 | Khatwa et al. | 701/301 |
| 7,120,537 B2 | 10/2006 | Flynn et al. | 701/120 |
| 7,123,169 B2 | 10/2006 | Farmer et al. | 340/945 |
| 7,123,192 B2 | 10/2006 | Smith et al. | 342/455 |
| 7,126,534 B2 | 10/2006 | Smith et al. | 342/456 |
| 7,136,059 B2 | 11/2006 | Kraud et al. | 345/419 |
| 7,142,154 B2 | 11/2006 | Quilter et al. | 342/357.06 |
| 7,148,816 B1 | 12/2006 | Carrico | 340/961 |
| 7,155,240 B2 | 12/2006 | Atkinson et al. | 455/456.2 |
| 7,164,986 B2 | 1/2007 | Humphries et al. | 701/207 |
| 7,170,441 B2 | 1/2007 | Perl et al. | 342/29 |
| 7,170,820 B2 | 1/2007 | Szajnowski | 367/127 |
| 7,187,327 B2 | 3/2007 | Coluzzi et al. | 342/458 |
| 7,190,303 B2 | 3/2007 | Rowlan | 342/29 |
| 7,196,621 B2 | 3/2007 | Kochis | 340/539.13 |
| 7,206,698 B2 | 4/2007 | Conner et al. | 701/301 |
| 7,218,276 B2 | 5/2007 | Teranishi | 342/357.1 |
| 7,218,278 B1 | 5/2007 | Arethens | 342/367.03 |
| 7,221,308 B2 | 5/2007 | Burton et al. | 342/42 |
| 7,228,207 B2 | 6/2007 | Clarke et al. | 701/3 |
| 7,233,545 B2 | 6/2007 | Harvey, Jr. et al. | 367/127 |
| 7,248,963 B2 | 7/2007 | Baiada et al. | 701/120 |
| 7,250,901 B2 | 7/2007 | Stephens | 342/146 |
| 7,257,469 B1 | 8/2007 | Pemble | 701/3 |
| 7,272,495 B2 | 9/2007 | Coluzzi et al. | 701/207 |
| 7,277,052 B2 | 10/2007 | Delaveau et al. | 342/387 |
| 7,286,624 B2 | 10/2007 | Woo et al. | 375/356 |
| 7,307,578 B2 | 12/2007 | Blaskovich et al. | 342/29 |
| 7,308,343 B1 | 12/2007 | Horvath et al. | 701/3 |
| 7,321,813 B2 | 1/2008 | Meunier | 701/10 |
| 7,333,052 B2 | 2/2008 | Maskell | 342/195 |
| 7,333,887 B2 | 2/2008 | Baiada et al. | 701/120 |
| 7,352,318 B2 | 4/2008 | Osman et al. | 342/37 |
| 7,358,854 B2 | 4/2008 | Egner et al. | 340/539.13 |
| 7,379,165 B2 | 5/2008 | Anderson et al. | 356/5.05 |
| 7,382,286 B2 | 6/2008 | Cole et al. | 340/961 |
| 7,383,104 B2 | 6/2008 | Ishii et al. | 701/3 |
| 7,383,124 B1 | 6/2008 | Vesel | 701/200 |
| 7,385,527 B1 | 6/2008 | Clavier et al. | 340/945 |
| 7,391,359 B2 | 6/2008 | Ootomo et al. | 342/37 |
| 7,398,157 B2 | 7/2008 | Sigurdsson et al. | 701/213 |
| 7,400,297 B2 | 7/2008 | Ferreol et al. | 342/377 |
| 7,408,497 B2 | 8/2008 | Billaud et al. | 342/30 |
| 7,408,498 B2 | 8/2008 | Kuji et al. | 342/37 |
| 7,420,501 B2 | 9/2008 | Perl | 342/30 |
| 7,430,218 B2 | 9/2008 | Lee et al. | 370/464 |
| 7,437,225 B1 | 10/2008 | Rathinam | 701/14 |
| 7,440,846 B2 | 10/2008 | Irie et al. | 701/200 |
| 7,457,690 B2 | 11/2008 | Wilson, Jr. | 701/3 |
| 7,460,866 B2 | 12/2008 | Salkini et al. | 455/431 |
| 7,460,871 B2 | 12/2008 | Humphries et al. | 455/456.1 |
| 7,477,145 B2 | 1/2009 | Tatton et al. | 340/531 |
| 7,479,919 B2 | 1/2009 | Poe et al. | 342/30 |
| 7,479,922 B2 | 1/2009 | Hunt et al. | 342/357.02 |
| 7,479,923 B2 | 1/2009 | Carpenter | 342/357.02 |
| 7,479,925 B2 | 1/2009 | Schell | 342/455 |
| 7,487,108 B2 | 2/2009 | Aoki et al. | 705/13 |
| 7,501,977 B2 | 3/2009 | Ino | 342/37 |
| 7,504,996 B2 | 3/2009 | Martin | 342/357.12 |
| 7,515,715 B2 | 4/2009 | Olive | 380/255 |
| 2001/0014847 A1 | 8/2001 | Keenan | 701/117 |
| 2001/0026240 A1 | 10/2001 | Neher | 342/357.07 |
| 2002/0021247 A1 | 2/2002 | Smith et al. | 342/450 |
| 2002/0089433 A1 | 7/2002 | Bateman et al. | 340/970 |
| 2002/0152029 A1 | 10/2002 | Sainthuile et al. | 701/301 |
| 2003/0004641 A1 | 1/2003 | Corwin et al. | 701/301 |
| 2003/0009267 A1 | 1/2003 | Dunsky et al. | 701/4 |
| 2003/0097216 A1 | 5/2003 | Etnyre | 701/120 |
| 2003/0152248 A1 | 8/2003 | Spark et al. | 382/103 |
| 2003/0158799 A1 | 8/2003 | Kakihara et al. | 705/30 |
| 2004/0002886 A1* | 1/2004 | Dickerson et al. | 705/9 |
| 2004/0004554 A1 | 1/2004 | Srinivasan et al. | 340/870.01 |
| 2004/0039806 A1 | 2/2004 | Miras | 709/223 |
| 2004/0044463 A1 | 3/2004 | Shing-Feng et al. | 701/120 |
| 2004/0086121 A1 | 5/2004 | Viggiano et al. | 380/255 |
| 2004/0094622 A1 | 5/2004 | Vismara | 235/384 |
| 2004/0210371 A1 | 10/2004 | Adachi et al. | 701/50 |
| 2004/0225432 A1 | 11/2004 | Pilley et al. | 701/117 |
| 2004/0266341 A1 | 12/2004 | Teunon | 455/12.1 |
| 2005/0007272 A1 | 1/2005 | Smith et al. | 342/189 |
| 2005/0021283 A1 | 1/2005 | Brinton et al. | 702/150 |
| 2005/0046569 A1 | 3/2005 | Spriggs et al. | 340/551 |
| 2005/0057395 A1 | 3/2005 | Atkinson | |
| 2005/0159170 A1 | 7/2005 | Humphries et al. | 455/456.1 |
| 2005/0166672 A1 | 8/2005 | Atkinson | 73/290 |
| 2005/0192717 A1 | 9/2005 | Tafs et al. | 701/3 |
| 2005/0228715 A1 | 10/2005 | Hartig et al. | 705/13 |
| 2005/0231422 A1 | 10/2005 | Etnyre | 342/182 |
| 2006/0023655 A1 | 2/2006 | Engel et al. | 370/328 |
| 2006/0044184 A1 | 3/2006 | Kimura | 342/357.09 |
| 2006/0052933 A1 | 3/2006 | Ota | 701/200 |
| 2006/0119515 A1 | 6/2006 | Smith | 342/450 |
| 2006/0129310 A1 | 6/2006 | Tarrant et al. | 701/201 |
| 2006/0161340 A1 | 7/2006 | Lee | 701/207 |
| 2006/0167598 A1 | 7/2006 | Pennarola | 701/11 |
| 2006/0181447 A1 | 8/2006 | Kuji et al. | 342/32 |
| 2006/0191326 A1 | 8/2006 | Smith et al. | 73/73 |
| 2006/0208924 A1 | 9/2006 | Matalon | 340/933 |
| 2006/0250305 A1 | 11/2006 | Coluzzi et al. | 342/458 |
| 2006/0262014 A1 | 11/2006 | Shemesh et al. | 342/386 |
| 2006/0265664 A1 | 11/2006 | Simons et al. | 715/722 |
| 2006/0276201 A1 | 12/2006 | Dupray | 455/456.1 |
| 2007/0001903 A1 | 1/2007 | Smith et al. | 342/387 |
| 2007/0040734 A1 | 2/2007 | Evers | 342/126 |
| 2007/0060079 A1 | 3/2007 | Nakagawa et al. | 455/131 |
| 2007/0090295 A1 | 4/2007 | Parkinson et al. | 250/349 |
| 2007/0106436 A1 | 5/2007 | Johansson | 701/23 |
| 2007/0109184 A1 | 5/2007 | Shyr et al. | 342/357.06 |
| 2007/0159356 A1 | 7/2007 | Borel et al. | 340/945 |
| 2007/0159378 A1 | 7/2007 | Powers et al. | 342/29 |
| 2007/0182589 A1 | 8/2007 | Tran | 340/961 |
| 2007/0213887 A1 | 9/2007 | Woodings | 701/1 |
| 2007/0222665 A1 | 9/2007 | Koeneman | 342/29 |
| 2007/0250259 A1 | 10/2007 | Dare | 701/201 |
| 2007/0252750 A1 | 11/2007 | Jean et al. | 342/40 |
| 2007/0298786 A1 | 12/2007 | Meyers et al. | 455/431 |
| 2008/0027596 A1 | 1/2008 | Conner et al. | 701/16 |
| 2008/0042880 A1 | 2/2008 | Ramaiah et al. | 340/958 |
| 2008/0042902 A1 | 2/2008 | Brandwood et al. | 342/465 |
| 2008/0062011 A1 | 3/2008 | Butler et al. | 340/961 |
| 2008/0063123 A1 | 3/2008 | De Mey et al. | 375/350 |
| 2008/0068250 A1 | 3/2008 | Brandao et al. | 342/30 |
| 2008/0088508 A1 | 4/2008 | Smith | 342/453 |
| 2008/0106438 A1 | 5/2008 | Clark et al. | 340/972 |
| 2008/0106457 A1 | 5/2008 | Bartolini et al. | 342/40 |
| 2008/0109343 A1 | 5/2008 | Robinson et al. | 705/37 |
| 2008/0117106 A1 | 5/2008 | Sarno et al. | 342/444 |
| 2008/0120032 A1 | 5/2008 | Brandao et al. | 701/300 |
| 2008/0129601 A1 | 6/2008 | Thomas | 342/465 |
| 2008/0132270 A1 | 6/2008 | Basir | 455/550.1 |
| 2008/0137524 A1 | 6/2008 | Anderson et al. | 370/203 |
| 2008/0150784 A1 | 6/2008 | Zhang et al. | 342/30 |
| 2008/0158040 A1 | 7/2008 | Stayton et al. | 342/32 |
| 2008/0158059 A1 | 7/2008 | Bull et al. | 342/387 |
| 2008/0174472 A1 | 7/2008 | Stone et al. | 342/30 |
| 2008/0183344 A1 | 7/2008 | Doyen et al. | 701/9 |

| Publication | Date | Assignee | Class |
|---|---|---|---|
| 2008/0186224 A1 | 8/2008 | Ichiyanagi et al. | 342/109 |
| 2008/0186231 A1 | 8/2008 | Aljadeff et al. | 342/387 |
| 2008/0195309 A1 | 8/2008 | Prinzel, III et al. | 701/208 |
| 2008/0231494 A1 | 9/2008 | Galati | 342/37 |
| 2008/0252528 A1 | 10/2008 | Shen et al. | 342/451 |
| 2008/0266166 A1 | 10/2008 | Schuchman | 342/97 |
| 2008/0272227 A1 | 11/2008 | Sharpe | 244/3.16 |
| 2008/0275642 A1 | 11/2008 | Clark et al. | 701/208 |
| 2008/0294306 A1 | 11/2008 | Huynh et al. | 701/3 |
| 2008/0297398 A1 | 12/2008 | Kamimura | 342/38 |
| 2009/0005960 A1 | 1/2009 | Roberts et al. | 701/120 |
| 2009/0009357 A1 | 1/2009 | Heen et al. | 340/825.09 |
| 2009/0012660 A1 | 1/2009 | Roberts et al. | 701/3 |
| 2009/0012661 A1 | 1/2009 | Louis | 701/9 |
| 2009/0015471 A1 | 1/2009 | Shen et al. | 342/357.15 |
| 2009/0027270 A1 | 1/2009 | Fisher et al. | 342/387 |
| 2009/0051570 A1 | 2/2009 | Clark et al. | 340/971 |
| 2009/0055038 A1 | 2/2009 | Garrec et al. | 701/17 |

FOREIGN PATENT DOCUMENTS

| | | |
|---|---|---|
| DE | 4306660 A1 | 8/1974 |
| DE | 4204164 A1 | 8/1993 |
| DE | 19751092 A1 | 6/1999 |
| DE | 10149006 A1 | 4/2003 |
| DE | 202004007747 U1 | 9/2004 |
| DE | 202006005089 U1 | 6/2006 |
| DE | 102006009121 A1 | 8/2007 |
| EP | 0265902 A2 | 5/1988 |
| EP | 0346461 A1 | 12/1989 |
| EP | 0466239 | 1/1992 |
| EP | 0514826 A1 | 11/1992 |
| EP | 0550073 A2 | 7/1993 |
| EP | 0574009 A3 | 6/1994 |
| EP | 0613110 A1 | 8/1994 |
| EP | 0613111 A1 | 8/1994 |
| EP | 0614092 A1 | 9/1994 |
| EP | 0629877 A1 | 12/1994 |
| EP | 0355336 B1 | 8/1995 |
| EP | 0670566 A2 | 9/1995 |
| EP | 0682332 A1 | 11/1995 |
| EP | 0505827 B1 | 6/1996 |
| EP | 0385600 B1 | 7/1996 |
| EP | 0732596 A2 | 9/1996 |
| EP | 0487940 B1 | 1/1997 |
| EP | 0774148 A1 | 5/1997 |
| EP | 0578316 B1 | 4/1998 |
| EP | 0915349 A1 | 5/1999 |
| EP | 1022580 A3 | 2/2001 |
| EP | 1118871 A2 | 7/2001 |
| EP | 0877997 B1 | 12/2001 |
| EP | 0778470 B1 | 5/2002 |
| EP | 1202233 A1 | 5/2002 |
| EP | 0865004 B1 | 7/2002 |
| EP | 1109032 B1 | 3/2003 |
| EP | 1300689 A2 | 4/2003 |
| EP | 1331620 A1 | 7/2003 |
| EP | 1345044 A1 | 9/2003 |
| EP | 1369704 A1 | 12/2003 |
| EP | 1302920 B1 | 2/2004 |
| EP | 1396832 A1 | 3/2004 |
| EP | 1406228 A2 | 4/2004 |
| EP | 1070968 B1 | 5/2004 |
| EP | 1431946 A1 | 6/2004 |
| EP | 1467575 A1 | 10/2004 |
| EP | 1471365 | 10/2004 |
| EP | 0903589 B1 | 11/2004 |
| EP | 1517281 A2 | 3/2005 |
| EP | 1531340 A1 | 5/2005 |
| EP | 0926510 B1 | 8/2005 |
| EP | 1405286 B1 | 9/2005 |
| EP | 1485730 B1 | 9/2005 |
| EP | 1428195 B1 | 10/2005 |
| EP | 1603098 A1 | 12/2005 |
| EP | 1125415 B1 | 1/2006 |
| EP | 1205732 B1 | 3/2006 |
| EP | 1632787 A1 | 3/2006 |
| EP | 1632892 A2 | 3/2006 |
| EP | 0953261 B1 | 6/2006 |
| EP | 1275975 B1 | 6/2006 |
| EP | 1285232 B1 | 6/2006 |
| EP | 1672384 A2 | 6/2006 |
| EP | 0987562 B1 | 7/2006 |
| EP | 1093564 B1 | 11/2006 |
| EP | 1218694 B1 | 11/2006 |
| EP | 1727094 A2 | 11/2006 |
| EP | 1742170 A1 | 1/2007 |
| EP | 1188137 B1 | 2/2007 |
| EP | 1755356 A1 | 2/2007 |
| EP | 1463002 B1 | 4/2007 |
| EP | 1361555 B1 | 5/2007 |
| EP | 1798572 A1 | 6/2007 |
| EP | 1410364 B1 | 10/2007 |
| EP | 1843161 A2 | 10/2007 |
| EP | 1860456 A1 | 11/2007 |
| EP | 1884462 A2 | 2/2008 |
| EP | 1101385 B1 | 3/2008 |
| EP | 1901090 A1 | 3/2008 |
| EP | 0964268 B1 | 4/2008 |
| EP | 1483755 B1 | 4/2008 |
| EP | 1906204 A2 | 4/2008 |
| EP | 1912077 A2 | 4/2008 |
| EP | 1331490 B1 | 6/2008 |
| EP | 1942351 A1 | 7/2008 |
| EP | 1327159 B1 | 8/2008 |
| EP | 1436641 B1 | 8/2008 |
| EP | 1953565 A1 | 8/2008 |
| EP | 1483902 B1 | 9/2008 |
| EP | 1965219 A1 | 9/2008 |
| EP | 1972962 A2 | 9/2008 |
| EP | 1975884 A1 | 10/2008 |
| EP | 1118011 B1 | 11/2008 |
| EP | 1995708 A1 | 11/2008 |
| EP | 2000778 A2 | 12/2008 |
| EP | 2001004 A2 | 12/2008 |
| EP | 2023155 A1 | 2/2009 |
| FR | 2708349 | 2/1995 |
| FR | 2791778 A1 | 10/2000 |
| FR | 2881841 A1 | 8/2006 |
| JP | 9-288175 A | 11/1994 |
| JP | 6-342061 A | 12/1994 |
| JP | 8-146130 A | 5/1996 |
| JP | 9-119983 A | 11/1996 |
| WO | WO9205456 A1 | 4/1992 |
| WO | WO 94/14251 | 6/1994 |
| WO | WO9427161 A1 | 11/1994 |
| WO | WO9428437 A1 | 12/1994 |
| WO | WO9503598 A1 | 2/1995 |
| WO | WO9521388 A1 | 8/1995 |
| WO | WO9605562 A1 | 2/1996 |
| WO | WO9635961 A1 | 11/1996 |
| WO | WO9726552 A2 | 7/1997 |
| WO | WO9747173 A2 | 12/1997 |
| WO | WO9804965 A2 | 2/1998 |
| WO | WO9805977 A1 | 2/1998 |
| WO | WO9814926 A1 | 4/1998 |
| WO | WO9822834 A1 | 5/1998 |
| WO | WO9822923 A1 | 5/1998 |
| WO | WO9835311 A1 | 8/1998 |
| WO | WO9843107 A1 | 10/1998 |
| WO | WO9849654 A1 | 11/1998 |
| WO | WO9908251 A1 | 2/1999 |
| WO | WO9935630 A1 | 7/1999 |
| WO | WO9942855 A1 | 8/1999 |
| WO | WO9945519 A2 | 9/1999 |
| WO | WO 99/50985 | 10/1999 |

| | | |
|---|---|---|
| WO | WO9950985 | 10/1999 |
| WO | WO9956144 A1 | 11/1999 |
| WO | WO0023816 A1 | 4/2000 |
| WO | WO0039775 A2 | 7/2000 |
| WO | WO0111389 A1 | 2/2001 |
| WO | WO0133302 A2 | 5/2001 |
| WO | WO0148652 A1 | 7/2001 |
| WO | WO0157550 A1 | 8/2001 |
| WO | WO0159601 A1 | 8/2001 |
| WO | WO0163239 A1 | 8/2001 |
| WO | WO0165276 A1 | 9/2001 |
| WO | WO 0186319 | 11/2001 |
| WO | WO0186319 | 11/2001 |
| WO | WO0194969 A2 | 12/2001 |
| WO | WO0205245 A2 | 1/2002 |
| WO | WO0208784 A1 | 1/2002 |
| WO | WO0215151 A1 | 2/2002 |
| WO | WO0227275 A2 | 4/2002 |
| WO | WO02054103 A2 | 7/2002 |
| WO | WO02059838 A2 | 8/2002 |
| WO | WO02066288 A1 | 8/2002 |
| WO | WO02069300 A1 | 9/2002 |
| WO | WO02075667 A1 | 9/2002 |
| WO | WO02091312 A2 | 11/2002 |
| WO | WO02095709 A2 | 11/2002 |
| WO | WO02099769 | 12/2002 |
| WO | WO03013010 A1 | 2/2003 |
| WO | WO03016937 A1 | 2/2003 |
| WO | WO03023439 A2 | 3/2003 |
| WO | WO03027934 A1 | 4/2003 |
| WO | WO03054830 A2 | 7/2003 |
| WO | WO03056495 A1 | 7/2003 |
| WO | WO03060855 A1 | 7/2003 |
| WO | WO03067281 A1 | 8/2003 |
| WO | WO03079136 A2 | 9/2003 |
| WO | WO03081560 A1 | 10/2003 |
| WO | WO03093775 A2 | 11/2003 |
| WO | WO03096282 A1 | 11/2003 |
| WO | WO03098576 A1 | 11/2003 |
| WO | WO03107299 A2 | 12/2003 |
| WO | WO2004042418 A1 | 5/2004 |
| WO | WO2004068162 A2 | 8/2004 |
| WO | WO2004109317 A2 | 12/2004 |
| WO | WO2004114252 A1 | 12/2004 |
| WO | WO2005017555 A2 | 2/2005 |
| WO | WO2005038478 A2 | 4/2005 |
| WO | WO2005052887 A1 | 6/2005 |
| WO | WO2005081012 A1 | 9/2005 |
| WO | WO2005081630 A2 | 9/2005 |
| WO | WO2005114613 A1 | 12/2005 |
| WO | WO2005121701 A2 | 12/2005 |
| WO | WO2006070207 A1 | 7/2006 |
| WO | WO2006079165 A1 | 8/2006 |
| WO | WO2006088554 A1 | 8/2006 |
| WO | WO2006093682 A2 | 9/2006 |
| WO | WO2006108275 A1 | 10/2006 |
| WO | WO2006110973 A1 | 10/2006 |
| WO | WO2006135916 A1 | 12/2006 |
| WO | WO2006135923 A2 | 12/2006 |
| WO | WO2007001660 A2 | 1/2007 |
| WO | WO2007010116 A1 | 1/2007 |
| WO | WO2007012888 A1 | 2/2007 |
| WO | WO2007013069 A1 | 2/2007 |
| WO | WO2007048237 A1 | 5/2007 |
| WO | WO2007086899 A2 | 8/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008051292 A2 | 5/2008 |
| WO | WO2008053173 A1 | 5/2008 |
| WO | WO2008065328 A2 | 6/2008 |
| WO | WO2008065658 A1 | 6/2008 |
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

World Airport Week, "Sharing Makes the Airport Go Round," Jan. 21, 1997, p. 1.*

Gouliquer, "Terminal, Leanding Fees Increase,", Apr. 1, 2001, Northern Ontario Business, vol. 21, Issue 6, p. 24.*

Traffic Alert System Technical Design Summary, Final Report, Apr. 1994 (Baldwin et al.).

Airscene, The complete Air Traffic Picture in Real Time, www.airscene.com, Rannoch Corporation, Alexandria, Virginia, undated.

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Cutomers Worldwide", Apr. 28, 2003, http://www.flightexplorer/com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herrero J.A. Portas, F.J. Rodriguez, (*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.

Application of CNS/ATM Technologies to Airport Management, Alex Smith & Jon Baldwin, Rannoch Corporation, 1800 Diagonal Rd, Suite 430, Alexandria, VA 22314, USA (undated).

"Overview of the FAA ADS-B Link Decision", John Scardina, Director, Office of System Architecture and Investment Analysis, Federal Aviation Administration, Jun. 7, 2002.

Automated Correlation of Aircraft Flight Tracks and Events with ATC Data, Alex Smith, Rannoch Corporation, 1800 Diagonal Rd, Suite 430, Alexandria, VA 22314, USA (undated).

"Ground-Based Transceiver (GBT) for Broadcast Services Using the Universal Access Transceiver (UAT) Data Link", FAA-E-2973, Department of Transportation, Federal Aviation Administration, Jan. 15, 2004.

"The Future of Alerts ADS-B Seminar", Mark Palm, Thales Melbourne, Thales Air Systems Division, undated.

"Wide Area Multilateration Report on EATMP TRS 131/04 Version 1.1", NLR-CR-2004-472, Roke Manor, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.

GPS Risk Assessment Study, Final Report, T.M. Corrigan et al., Johns Hopkins Univ., Applied Physics Laboratory, Jan. 1999.

A New Positioning System Using Television Synchronization Signals, Matthew Rabinowitz, James Spilker, ROSUM, undated.

Radio Wave Propagation, Kamran Ahmed, Powerpoint presentation, undated.

Aircraft Noise Report, vol. 17, No. 1, Jan. 31, 200.

ASA MASPS—Change Issue, James Maynard, Oct. 21, 2002.

ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.

ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.

A Radar Substitute—David Hughes, Aviation Week & Space Technology, Mar. 7, 2005.

Statement of ACI-NA and AAAE on Airport Improvement Program Reauthorization before the Senate Aviation Subcommittee on Feb. 12, 1998. David Plavin.

AEROWARE Airport Management Software, AEROWARE, P.O. Box 220046 Kirkwood, MO 63122, www.areoware.com.

Draft Proposal for the Amendment of the Sub-Cap on Off-Peak Takeoff and Landing Charges At Dublin Airport, Commission for Aviation Regulation, Nov. 23, 2003.

Aviation Infrastructure: Challenges Associated with Building and Maintaining Runways, General Accounting Office, GAO-01-90-T, Oct. 5, 2000.

Airfield Pavement: Keeping Nations Runways in Good Condition Could Require Substantially higher Spending, GAO/RCED-98-226, Jul. 1998.

Albany International Airport Pavement Management System, Albany, New York, Albany International Airport GIS-Based Pavement and Facilities Management , Fall, 2002.

Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.

Dynatest Airports PMS, Dynatest International Rev. 040101-9, www.dynatest.com.

Micropaver, Dr. M.Y. Shahin, CECER-CFF Champaign, IL May 2, 2005.

Raytheon Systems Limited Launches a Unique Solution for ADS-B,. Jan. 19, 2005, Raytheon Corp. http://www.raytheon.co.uk/highlights/ATMS.html.

Raytheon Systems Limited's ADS-B Solution Prized by International Air Traffic Authorities, Feb. 2, 2005, http://www.raytheon.co.uk/news_room/news/press_02022005.pdf.

http://www.airsysatm.thomson-csf.com/products/NAV/ads_b.htm.
http://www.eurocontrol.be/care/asas/tn-workshop1/asas-tn-vanderkraan2.ppt.
http://www.eurocontrol.be/care/asas/tn-workshop1/asas-tn-howlett.ppt.

Boeing Subsidiary and Megadata Announce Joint Marketing Agreement, Press Release, Aug. 7, 2003.

www.rtel.com realtime Market Information, "Baggage Modeling to Improve the Business Passenger Experience" (undated).

Switch, Airport Core Product Description (undated).

Federal Airways & Airspace, Inc. Because Accuracy Matters, Feb. 2003, Jan. 2002.

VDL4 TM Alignment With DO-242A (RTCA ADS-B MASPS) WG51/SG2, NASA, Sep. 2003.

Method to Provide System-Wide ADS-B Back-Up, Validation, and Security, A. Smith et al. $25^{th}$ AIAA/IEEE Digital Avionics Systems Conference, Oct. 15, 2006.

*Positive Identification of Aircraft on Surface Movement Area—Results of FAA Trials*, 10th Annual International AeroSense Symposium, Orlando, Florida, Apr. 1996.

*Surveillance Monitoring of Parallel Precision Approaches in a Free Flight Environment*, AIAA 16th Annual Digital Avionics Systems Conference, Oct. 1997.

*Analysis of ADS-B, ASDE-3 and Multilateration Surveillance Performance*—NASA Atlanta Demonstration Presented at the AIAA 17th Annual Digital Avionics Systems Conference in Oct. 1998.

*Application of ADS-B for Airport Surface Surveillance*, Daniel Hicok, Derrick Lee IEEE AIAA $17^{th}$ Annual Digital Avionics Conference, 1998.

Atlanta Hartsfield *International Airport—Results of FAA Trials to Accurately Locate/Identify Aircraft on the Airport Movement Area*, IEEE PLANS, Atlanta, GA, Apr. 1996.

*Evaluation of Airport Surface Surveillance Technologies*, IEEE Radar 96 conference, Beijing, China, Oct. 1996.

*Improved Location/Identification of Aircraft/Ground Vehicles on Airport Movement Areas—Results of FAA Trials*, Institute of Navigation in Santa Monica, CA, Jan. 1996.

*Sensis News*, http://www.sensis.com/docs/128/ © 1999-2006.

*Roke Radar, Design and development of miniature radars and fuze sensors through to major radar programme builds*, http://www.roke.co.uk/skills/radar/, © 2006.

*Acoustic System for Aircraft Detection and Tracking, based on Passive Microphone Arrays*. Caronna, Rosello, Testa, $148^{th}$ Meeting of the Acoustical Society of America, http://pcfite.ing.uniroma1.it/upload/research/4psp711079482021710.pdf Nov. 2004.

*Cel-Loc How We Do it, Technology Overview*, http://www.cell-loc.com/how_tech.html, Oct. 2, 2006 (original date unknown).

*Super-Radar, Done Dirt Cheap*, http://www.businessweek.com/magazine/content/03_42/b3854113.htm BusinessWeek Online, Oct. 20, 2003.

*Methods to Provide System-Wide ADS-B Back-Up, Validation and Security*, A. Smith, R. Cassell, T. Breen, R. Hulstrom, C. Evers, 25th AIAA/IEEE Digital Avionics Systems Conference, Oct. 15, 2006.

Damarel Systems International, LTD, Travel Automation Specialists, © 2004, www.damerel.com.

Airfield Pavement Computer Software, Mar. 23, 2005, Transport Canada https://www.tc.gc.ca/CivilAviation/International/Technical/Pavement/software.htm.

ARA Transportation, © 2004, http://www.araworldwide.com/expertise/industry/transportation.htm.

*The Twilight Zone, Can Wide-Area Multilateration Systems Become a Nightmare for MSSR Producers*? Aircraft Traffic Technology International 2005, Vladimir Manda, Viktor Sotona.

*Safety, Performance, and Interoperability Requirements Document for ADS-B NRA Application*, European Organisation for Civil Avaiation Equipment, Dec. 2005.

Passive Surveillance Using Multilateration, Roke Manor Research website (2003).

Letter from Marc Morgan, Siemens, Feb. 10, 2006.

*Required Navigation Performance (RNP) and Area Navigation (RNAV)*, Boeing, Aug. 2000.

*System-Wide ADS-B Back-Up and Validation*, A. Smith, R. Cassell, T. Breen, R. Hulstrom, C. Evers, 2006 Integrated Communications, Navigation, and Surveillance Conference.

Required Navigation Performance (RNP) Another step towards global implementation of CNS/ATM, Anita Trotter-Cox, Assessment Compliance Group, Inc. Published in Professional Pilot Magazine, Jun. 1999.

Airport Pavement Management Systems: An Appraisal of Erxisting Methodologies, Michel Gendreau and Patrrick Soriano;Pergamon Transn Res. A, vol. 32, No. 3, pp. 187-214, 1998.

*Components of a Pavement Maintenance Management System*, Mohamed Y. Shahin, U.S. Army Construction Engineering Research Laboratory, Transportaiton Research Record 791, pp. 31-39, 1980.

*Application of Markov Process to Pavement Management Systems at the Network Level*, Abbas Ahmad Butt, University of Iillinois at Urbana-Champaign (1991).

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, Aug. 1998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, RTCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Halm, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.

PCL system with illuminator of opportunity, Huaiying tan, Min ren, Bo lie, Jinning Song, Beijing Radar Instiitute, IEEE 0-7803-9582-4/06, Apr. 2006.

High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.

Denial of bistatic hosting by spatial-temporal waveform design; H.D. Griffiths, M.C. Wicks, D. Weinder, R. Adve, P.A. Antonik, and I. Fotinopoulos, IEE Proc. Radar Sonar Navig., vol. 152, No. 2, Apr. 2005.

Passive coherent location FPGA implementation of the cross ambiguity function; Kvasnicka, M. Hermanek, A. Kunes, M. Pelant, M. Plsek, R., Proceedings- SPIE The International Society for Optical Engineering; 2006, vol. 6159; Part 1, pp. 615918; International Society for Optical Engineering.

Passive coherent location system simulation and evaluation, Proc. SPIE, vol. 6159, 615917 (2006); DOI:10.1117/12.675065 , Apr. 26, 2006 ; Conference Title: Photonics Applications in Astronomy, Communications, Industry, and High-Energy Physics Experiments IV Libor Slezák Michael Kvasnicka,Martin Pelant, and Ji Vávra *ERA a.s.* (Czech Republic) *Radek Plsek Technical Univ. of Pardubice* (Czech Republic).

Huaiying Tan et al. *PCL System With Illuminator of Opportunity* Proceedings of 2006 CIE International Conference on Radar, vol. 1,Octoebre 16, 2006.

Griffiths H D et al., *Denial of Bistatic Hosting by Spatial-Temporal Waveform Design* IEE Proceedings: Radar, Sonar & Navigation, Institution of Electrical Engineers, GB, vol. 152, No. 2, Apr. 8, 2005.

Jafargholi et al, *High Accurate Multiple Target Detection in PCL Radar Systems*, Radar, 2006, CIE '06. International Conference on, IEEE, PI, Oct. 1, 2006.

Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.

ADS-X—Next Generation Surveillance Solutions, Alex Smith, Russell Hulstron, Rannoch Corporation, ATCA Oct. 2006.

Transtech Airport Solutions, Inc., http://www.transtech-solutions.com/products/asm/airport.html, Feb. 12, 2009.

Eurocontrol Standard Document for Surveillance Interchange Part 14: Category 020, Multilateration Target Reports, SUR.ET1.ST05.2000-STD-14-02, Apr. 2008.

ATO Advanced Technology Development and Prototyping Group, http://222.faa.gov/about/office_org/headquarters_offices/ato/service_units/operations/td/.. Jan. 16, 2008.

Honeywell Mode S Transponder 2/3/4 Requirements, undated.

MSS by ERA, ERA Corporation, McLean, Virginia, undated.

Form B- Proposal Summary, NASA SBIR 02-1 Solicitation, http://sbir.nasa.gov/SBIR/abstracts/02/sbir/phase1/SBIR-02-1-A3.01-9714.html Sep. 5, 2002.

Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.

NASA 1998 SBIR Phase 1, Proposal No. 91-1 01.02-9780B (1998) http://sbir.nasa.gov/SBIR/abstracts/98/sbir/phase1/SBIR-98-1-01.02-9780B.html.

NOVA 9000 Air Traffic Control System (ATCS), Park Air Systems, undated.

"UK ADS-B in radar environment" (Mark Watson) http://www.eurocontrol.int/cascade/gallery/content/public/documents/Presentations/Session%20%202%20-%20Trials%20and%20Implementations/Watson%20-%20UK%20ADS-B%20in%20a%20radar%20environment.pdf (2006).

Ground Vehicle Operations on Airports, FAA Advisory Circular AC No. 150/5210-20 Jun. 21, 2002.

* cited by examiner

| Variable Name | Definitions | Type | Num blank | Values | Existing QRS Data Element Attribute name |
|---|---|---|---|---|---|
| A Carrier Code | | Alpha(2) | 0 | AA, etc. | airline_dot_cd |
| B Flight Number | | Num(4) | 0 | 0001-9999 | ft_oag_num |
| C Departure Airport Code | | Alpha(3) | 0 | JFK, etc. | asqp_orig_port_cd |
| D Arrival Airport Code | | Alpha(3) | 0 | LAX, etc. | asqp_dest_port_cd |
| E1 Date of Operation - Year | | Year(2) | 0 | 95 or 96 | |
| E2 Date of Operation - Month | | Month(2) | 0 | 01 - 12 | asqp_depart_dt |
| E3 Date of Operation - Day | | Day(2) | 0 | 01 - 31 | |
| F Day of Week of this flight | | Num | 0 | 1=Monday, 7=Sunday | new_yrs_day_cd |
| G Departure Time - OAG | Scheduled | Num(4) | 0 | HHmm | asqp_oag_sched_depart_tm |
| H Departure Time - CRS | Scheduled | Num(4) | 0 | HHmm | asqp_crs_sched_depart_tm |
| I Departure Time - Actual | Local time | Num(4) | 0 | HHmm | asqp_act_depart_tm |
| J Arrival Time - OAG | Scheduled | Num(4) | 0 | HHmm | asqp_oag_sched_arrive_tm |
| K Arrival Time - CRS | Scheduled | Num(4) | 0 | HHmm | asqp_crs_sched_arrive_tm |
| L Arrival Time - Actual | Local time | Num(4) | 0 | HHmm | asqp_act_arrive_tm |
| M Departure Delay - OAG - CRS | G - H | Num(4) | 0 | h minutes | |
| N Arrival Delay - OAG - CRS | J - K | Num(4) | 0 | h minutes | |
| O Elapsed Time - CRS | K - H | Num(4) | 0 | h minutes | asqp_crs_sched_elapse_min |
| P Elapsed Time - Actual | L - I | Num(4) | 0 | h minutes | asqp_act_elapse_min |
| Q Departure Delay - Actual - CRS | I - H | Num(4) | 0 | h minutes | asqp_delay_depart_min |
| R Arrival Delay - Actual - CRS | L - K | Num(4) | 0 | h minutes | asqp_delay_arrive_min |
| S Elapsed Time Difference - Actual - CRS | P - O | Num(4) | 0 | h minutes | asqp_delay_flght_min |
| T Wheels Off Time | Local time | Num(4) | 0 | HHmm | |
| U Wheels On Time | Local time | Num(4) | 0 | HHmm | |
| V Aircraft Tail Number | | Alpha(6) | 0 | N135AA, etc. | |
| W Taxi Out Time | | Num(4) | 0 | h minutes | |
| X Taxi In Time | | Num(4) | 0 | h minutes | |
| Y Airborne Time | | Num(4) | 0 | h minutes | |

AUTOMATED MANAGEMENT OF AIRPORT REVENUES

CROSS-REFERENCE TO RELATED APPLICATIONS

The present application is a Continuation-In-Part application of U.S. patent application Ser. No. 10/743,042, filed on Dec. 23, 2003, and incorporated herein by reference; U.S. patent application Ser. No. 10/742,042 in turn is a Continuation-In-Part application of U.S. patent application Ser. No. 10/638,524, filed Aug. 12, 2003, entitled "METHOD AND APPARATUS FOR IMPROVING THE UTILITY OF AUTOMATIC DEPENDENT SURVEILLANCE", now U.S. Pat. No. 6,806,829, which is incorporated herein by reference in its entirety, which in turn is a Continuation of U.S. patent application Ser. No. 09/516,215, filed on Feb. 29, 2000, which in turn claims priority from Provisional Application Ser. No. 60/123,170, filed Mar. 5, 1999, both of which are incorporated herein by reference in its entirety; U.S. application Ser. No. 10/743,042 is also a Continuation-In-Part of U.S. patent application Ser. No. 10/319,725, filed Dec. 16, 2002, entitled "VOICE RECOGNITION LANDING FEE BILLING SYSTEM", Now U.S. Pat. No. 6,812,890, incorporated herein by reference in its entirety; U.S. application Ser. No. 10/743,042 is also Continuation-In-Part of U.S. patent application Ser. No. 10/457,439, filed Jun. 10, 2003, entitled "Correlation of Flight Track Data with Other Data Sources", incorporated herein by reference in its entirety; U.S. application Ser. No. 10/743,042 also claims priority from Provisional U.S. Patent Application No. 60/343,237 filed Dec. 31, 2001, incorporated herein by reference in its entirety;

The present application is also a Continuation-In-Part application of U.S. patent application Ser. No. 11/031,457, filed on Jan. 7, 2005, and incorporated herein by reference, which in turn is a Continuation-In-Part application of U.S. patent application Ser. No. 10/638,524, filed Aug. 12, 2003, entitled "METHOD AND APPARATUS FOR IMPROVING THE UTILITY OF AUTOMATIC DEPENDENT SURVEILLANCE", now U.S. Pat. No. 6,806,829, which is incorporated herein by reference in its entirety, which in turn is a Continuation of U.S. patent application Ser. No. 09/516,215, filed on Feb. 29, 2000 now U.S. Pat. No. 6,633,259, which in turn claims priority from Provisional Application Ser. No. 60/123,170, filed Mar. 5, 1999, all of which are incorporated herein by reference in its entirety; application Ser. No. 11/031,457 is also a Continuation-In-Part of U.S. patent application Ser. No. 10/319,725, filed Dec. 16, 2002, entitled "VOICE RECOGNITION LANDING FEE BILLING SYSTEM", now U.S. Pat. No. 6,812,890, incorporated herein by reference in its entirety; application Ser. No. 11/031,457 is also a Continuation-In-Part of U.S. patent application Ser. No. 10/457,439, filed Jun. 10, 2003 entitled "Correlation of Flight Track Data with Other Data Source", incorporated herein by reference in its entirety; application Ser. No. 11/031,457 also claims priority from Provisional U.S. Patent Application Ser. No. 60/440,618, filed Jan. 17, 2003, incorporated herein by reference in its entirety;

The present application is also a Continuation-In-Part application of U.S. patent application Ser. No. 10/756,799 filed Jan. 14, 2004, and incorporated herein by reference; application Ser. No. 10/756,799 is a Continuation-In-Part application of U.S. patent application Ser. No. 10/638,524, filed Aug. 12, 2003, entitled "METHOD AND APPARATUS FOR IMPROVING THE UTILITY OF AUTOMATIC DEPENDENT SURVEILLANCE", which is incorporated herein by reference in its entirety, which in turn is a Continuation of U.S. patent application Ser. No. 09/516,215, filed on Feb. 29, 2000, which in turn claims priority from Provisional Application Ser. No. 60/123,170, filed Mar. 5, 1999, both of which are incorporated herein by reference in their entirety; application Ser. No. 10/756,799 is also a Continuation-In-Part of U.S. patent application Ser. No. 10/319,725, filed Dec. 16, 2002, entitled "VOICE RECOGNITION LANDING FEE BILLING SYSTEM", incorporated herein by reference in its entirety, which in turn claims priority from Provisional U.S. Patent No. 60/343,237, filed Dec. 31, 2001, also incorporated by reference in its entirety; application Ser. No. 10/756,799 is also a Continuation-In-Part of U.S. patent application Ser. No. 10/457,439, filed Jun. 10, 2003 entitled "Correlation of Flight Track Data with Other Data Source", incorporated herein by reference in its entirety; application Ser. No. 10/756,799 is also a Continuation-In-Part of U.S. patent application Ser. No. 10/751,118, filed on Jan. 5, 2004, entitled "Method and Apparatus to Correlate Aircraft Flight Tracks and Events with Relevant Airport Operations Information" which in turn claims priority from Provisional U.S. Patent Application Ser. No. 60/440,618, filed Jan. 17, 2003, incorporated herein by reference in its entirety; application Ser. No. 10/756,799 also claims priority from Provisional U.S. Patent Application Ser. No. 60/440,618, filed Jan. 17, 2003, incorporated herein by reference in its entirety; application Ser. No. 10/756,799 is also a Continuation-In-Part of U.S. patent application Ser. No. 10/743,012, filed Dec. 23, 2003 entitled "METHOD AND APPARATUS FOR ACCURATE AIRCRAFT AND VEHICLE TRACKING" (Alexander E. Smith et al.), incorporated herein by reference; application Ser. No. 10/756,799 also claims priority from Provisional U.S. Patent Application Ser. No. 60/534,706, filed Jan. 8, 2004, incorporated herein by reference in its entirety;

The present application is a Continuation-In-Part application of U.S. patent application Ser. No. 10/830,444, filed on Apr. 23, 2004, and incorporated herein by reference; U.S. patent application Ser. No. 10/830,444 is a DIVISIONAL application of U.S. patent application Ser. No. 10/457,439, filed on Jun. 10, 2003, and incorporated herein by reference; U.S. patent application Ser. No. 10/457,439 in turn was a Continuation-In-Part application of U.S. patent application Ser. No. 09/516,215, filed Mar. 5, 1999, entitled "METHOD AND APPARATUS FOR IMPROVING THE UTILITY OF AUTOMATIC DEPENDENT SURVEILLANCE", Now U.S. Pat. No. 6,633,259, which is incorporated herein by reference in its entirety; U.S. patent application Ser. No. 10/457,439 was also a Continuation-In-Part of U.S. patent application Ser. No. 10/319,725, filed Dec. 16, 2002, entitled "VOICE RECOGNITION LANDING FEE BILLING SYSTEM", incorporated herein by reference in its entirety. U.S. patent application Ser. No. 10/457,439 also claims priority from Provisional U.S. Patent Application No. 60/440,618, filed Jan. 17, 2003, incorporated herein by reference in its entirety;

The present application is also Continuation-In-Part of U.S. patent application Ser. No. 11/111,957, filed on Apr. 22, 2005, and incorporated herein by reference;

The present application is also a Continuation-In-Part of U.S. patent application Ser. No. 11/145,170, filed on Jun. 6, 2005, and incorporated herein by reference.

The subject matter of the present application is related to the following issued U.S. Patents, assigned to the same assignee as the present invention, all of which are incorporated herein by reference in their entirety:

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction";

U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,384,783, issued on May 7, 2002, entitled "Method and Apparatus for Correlating Flight Identification Data With Secondary Surveillance Radar Data";

U.S. Pat. No. 6,448,929, issued Sep. 10, 2002, entitled "Method and Apparatus for Correlating Flight Identification Data With Secondary Surveillance Radar Data";

U.S. Pat. No. 6,567,043, issued May 20, 2003, entitled "METHOD AND APPARATUS FOR IMPROVING THE UTILITY OF AUTOMATIC DEPENDENT SURVEILLANCE";

U.S. Pat. No. 6,633,259 issued Oct. 14, 2003 "METHOD AND APPARATUS FOR IMPROVING THE UTILITY OF AUTOMATIC DEPENDENT SURVEILLANCE";

U.S. Pat. No. 6,806,829, issued Oct. 19, 2004, entitled "METHOD AND APPARATUS FOR IMPROVING THE UTILITY OF AUTOMATIC DEPENDENT SURVEILLANCE";

U.S. Pat. No. 6,812,890, issued Nov. 2, 2004, entitled "VOICE RECOGNITION LANDING FEE BILLING SYSTEM"; and U.S. Pat. No. 6,885,340, issued Apr. 26, 2005, entitled "CORRELATION OF FLIGHT TRACK DATA WITH OTHER DATA SOURCES".

FIELD OF THE INVENTION

The present invention relates to a system and method for managing airport revenues. In particular, the present invention is directed toward a system for using aircraft tracking information to help manage airport revenues.

BACKGROUND OF THE INVENTION

Most airports derive revenue from a variety of sources, and it is becoming more common for airports to finance operations from a combination of usage fees and to finance capital programs through grants, such as the Federal Airport Improvement Program (AIP) and Passenger Facility Charges (PFCs). (See, e.g., www.faa.gov). All of these revenue sources are based on the activity at the airport. AIP grant amounts are based on the passenger throughput and landed cargo weight. Approved PFC collection amounts are based on passenger throughput. In order to receive such government revenues or subsidies, however, an airport must be able to accurately track the number of passengers and amount of cargo passing through the airport. Manually tallying such data, or relying upon reported data from airlines can be cumbersome and inaccurate.

Traditional usage fees were generally limited to landing fees based on an aircraft maximum certified gross take-off weight. Airports would like to be able to more accurately bill for actual airport usage, which includes landing fees, use of gates, facilities and parking of aircraft, rather than just using flat fees based on gross aircraft weight. Traditionally, due to lack of technical solutions, airports used an honor system, whereby the airport relied on users to self-report their activity at the airport, such as landings, parking, cargo landed, and the like. However, when such data is carefully audited, many airports have found inadequacies in the honor system. Therefore, it remains a requirement in the art to provide a revenue management system that can track airport usage, passenger flow and landed cargo weight would maximize operational revenues as well as capital financing from AIP/PFC and other sources.

Airports operate using one of two accounting methods; residual costing or compensatory approaches. The main difference is risk allocation. The residual approach places the risk with the airlines, as their usage fees may need to increase to cover costs of airport operations. The compensatory approach may result in insufficient airport operational revenues, which would be an operating loss for the airport. In either case, airports have found that an independent accurate source of revenue management would be beneficial. For cost accounting, it benefits the users, (mainly signatory airlines) and the airport. Regardless of the accounting model used by the airport, an independent revenue management system would enhance operating revenues and capital program financing by more accurately tracking costs and usage.

Although all airports are somewhat different, it is important to point out that the sources of revenue at one of the "average" top 200 airports in the U.S. may be comparable to other, similar airports. For example, airport operational revenues usually may be derived from landing fees, automobile parking, and property management. Automobile parking usually accounts for 20 to 30% of revenue, landing and use fees usually account for 20 to 30%, and the remaining revenue is generally derived from property leases (e.g., for airlines and retail).

By comparison, capital program revenues are generally of the same order. For example, a typical landing fee for passenger aircraft may be in the region of $200-$400. The PFC entitlement, at $3 per paying passenger is therefore $300 for an aircraft carrying 100 or so passengers. Therefore the revenue entitlements being tracked are of similar magnitudes and should be managed appropriately.

With regard to tracking capital program entitlements, in a presentation titled "Optimizing Management of Airport Revenues," one of the present inventors, Mr. A. E. Smith, presented a summary of airport revenues at the 2005 Airport Finance & Administration Conference Sponsored by AAAE and Southeast Chapter AAAE, Jan. 30-Feb. 1, 2005. This presentation is incorporated herein by reference.

That presentation stated that 3300 airports in the U.S. national system received an average of $12 B per year for planned capital development. The largest source is bonds, followed by AIP, then PFCs, and estimates of airport capital developments range from $9 B-$15 B per year. AIP entitlements are based on cargo activity (landed cargo weight) and the number of enplaned passengers, which is based on a stratification of entitlements, with a minimum total of $1 M and a maximum of $26 M as follows: $7.80 for each of the first 50,000, $5.20 for each of the next 50,000, $2.60 for each of the next 400,000, $0.65 for each of the next 500,000, and $0.50 for each additional enplanement.

PFCs may be used in lieu of 50%-75% AIP entitlements. For more information on the PFC program refer to FAA Order 5500.1 (www.faa.gov), incorporated herein by reference. Other background documents include: AIP101, presented by FAA at the FAA Southwest Region Capital Planning Conference, Oct. 19, 2004, Fort Worth, Tex., and GAO-03-497T, Tuesday, Feb. 25, 2003, AIRPORT FINANCE, Past Funding Levels May Not Be Sufficient to Cover Airports' Planned Capital Development, both of which are incorporated herein by reference.

There are also many background documents written by Airport Council International (ACI) and the American Association of Airport Executives:

www.aci-na.org/docs/pfcfinaldraft.doc;
www.aaae.org/_pdf/_regpdf/040318pfc.doc;
www.aci-na.org/docs/Hotlights02-16-04.pdf;
www.commerce.senate.gov/hearings/212pla.htm;
www.house.gov/transportation/aviation/04-01-04/barclay.html; and
www.aaae.org/government/200_Regulatory_Affairs/100_What's_New;

all of which are incorporated herein by reference. Other related information may be found on the websites of the respective organizations, www.aci-na.org and www.aaae.org, both of which are also incorporated herein by reference.

Air carriers must collect and refund PFCs where necessary. PFCs are collected for each one-way trip in U.S. at either $3 or $4.50. PFCs are collected only for revenue passengers. Carriers collect PFCs and manage the money as a trust fund. Airlines are compensated for PFCs remitted (either $0.08/$0.11 per PFC). As of January 2005, the FAA approved over 350 airports, including over 90% of the top 100 airports, to collect PFCs. Over half of the airports are collecting at the higher $4.50 level. By the end of 2004, FAA had approved over $47.5 B in PFCs.

The amount and type of funding varies depending on airport size. For example, as illustrated in the chart of FIG. 1, large- and medium-hub airports depend primarily on bonds, while the smaller airports rely principally on AIP grants. Passenger facility charges are a more important source of revenue for the large- and medium-hub airports because they have the majority of commercial-service passengers.

FIG. 2 is a chart compiled by the General Accounting Office (GAO), illustrating various types of airport projects financed through the PFC programs. The reporting requirements imposed by the Government for PFC programs are fairly onerous. Airports must compile quarterly reports to provide oversight of PFC revenue to the FAA and the airlines. Airlines collecting PFCs from over 50,000 enplanements must conduct annual independent audits. The quarterly reports are monitored to see how well revenues track to the approved program. Excessive revenue accumulation may result in a revision of charge expiration, or a decrease in the PFC fee. For shortfalls, an increase of project total is possible (up to 15%) by extending the program expiration date.

In tracking use fees, airports have been constrained to available technologies and manual procedures that have been on the market. Flight tracking systems and associated systems are now available (see www.rannoch.com) for tracking aircraft in the vicinity of an airport and on the ground. One such system is described in the aforementioned U.S. Pat. No. 6,812,890, entitled "VOICE RECOGNITION LANDING FEE BILLING SYSTEM". The system of that Patent can track takeoffs and landings of aircraft using aircraft tracking data, transponder and other electronic data sources, as well as voice recognition of Air Traffic Control (ATC) communications. The system of that Patent has been installed at various airports with demonstrated success. After installation, billing for landing fees increased by as much as one third, clearly illustrating that previous manual reporting systems were inadequate.

It would be desirable to expand such a system (and it is one object of the present invention) to implement comprehensive billing systems to bill for airport usages, such as: Landing fees, Parking fee management, (By location/time period, and Overnights), Stratified user fees for signatory & non signatory users, FBO and GA fees, De-ice facilities, Ramp/apron/gate use, Maintenance facilities, Noise fee surcharges, Curfew violation fees, and the like. One method to achieve this is by the use of 2-D zones, as illustrated in FIG. 3, in combination with an airport's GIS systems and accurate aircraft tracking and identification. While there are several technologies available for tracking aircraft on the airport surface, none have been used in any real operational capacity to manage billing for usage, such as time on gate.

FIG. 4 is a diagram illustrating the Aerobahn system offered by Sensis Corporation of Dewitt New York. (See, e.g., www.sensis.com). KLM Royal Dutch Airlines (KLM) will begin an evaluation of Aerobahn Service at Amsterdam Airport Schiphol to assess the value of Aerobahn in improving the management of traffic into and out of the apron area. KLM is the second SkyTeam Alliance member to use Aerobahn. Sensis recently announced that Northwest Airlines has contracted for 60 months of Aerobahn Service for its Minneapolis-St. Paul International and Detroit Wayne County Metropolitan hub airports. Aerobahn provides airlines and airports with comprehensive operational information which positions users to more efficiently manage and measure airside operations. At Schiphol, ATC coordinators in KLM's Operations Control Center will use the data to help manage flight status and to closely coordinate movements with air traffic control to maximize efficiency and capacity. While this system may be able to track aircraft, it does not appear to be able to use such aircraft tracking data to manage airport revenue.

Accurate measurement of time on gate by specific aircraft would allow the airport to bill for use. Additionally, it would allow the airport to manage limited assets more efficiently. However, current systems do not utilize this data to enhance airport revenue management. Most existing aircraft billing and revenue management systems are manually intensive and rely on data inputs from disparate sources. Many of the datasets are incomplete, inaccurate, and result in less than perfect solutions.

One example of such a Prior Art system is the system in use at the Port Authority of New York and New Jersey as illustrated in FIG. 5. The system is called CATER, for Collection and Analysis of Terminal Records System. The system is described in the Port Authority's Request for Proposal 0000007548, Electronic Collection and Analysis of Terminal Records System and Itinerant Aircraft Billing System, dated Jan. 13, 2005.

Data sources include schedule information, such as the Official Airline Guide (OAG), the FAA's flight strips and also Airline Service Quality Performance Reports (ASQP). On first review, the approach appears to be comprehensive, but it lacks several key data items, and many of the data elements are incomplete. For more information on Airline Service Quality Performance Reports (ASQP) refer to http://web.mit-.edu/aeroastro/www/labs/ICAT/ and Documentation for the Consolidated Operations and Delay Analysis System, September 1997, Office of Aviation Policy and Plans Federal Aviation Administration Washington, D.C. 20591, both of which are incorporated herein by reference.

The FAA document states that ASQP data are collected by DOT to calculate on-time performance for its monthly Air Travel Consumer Report. Major air carriers are required by regulation to report this information. However, the reporting requirements apply only to air carriers with more than one percent of total domestic scheduled passenger revenues; the 10 carriers that must file include: Alaska Airlines, Northwest Airlines, America West Airlines, Southwest Airlines, American Airlines Trans World Airlines, Continental Airlines, United Airlines, Delta Air Lines, and USAir.

However, ASQP does not contain any information on the operations of smaller air carriers, commuters, air taxis, or on general aviation, cargo, military and international flights. The percentage of total operations for which ASQP has data varies depending on the mix of traffic at each airport. At those airports where a significant proportion of operations are not reported, the ground movement and flight times may be biased. In addition, ASQP does not provide any information on the aircraft type used for a flight.

FIG. 6 describes the data fields available from ASQP: FIG. 7 is a screenshot from January 2005 of statistics for the ASQP data from the Bureau of Transportation Statistics web site. As illustrated in FIG. 7, the tail number data is missing over 30% of the time. Other variables such as Airtime, TaxiOut, TaxiIn, WheelsOff, WheelsOn, and statistics related to the cause of delay show similar results. Therefore these existing sources of data for airport revenue management, while very useful, are incomplete, inaccurate, and offer a significant delay in data timeliness.

Another area of automation of financial management for airports is in Lease Management Systems. As stated above, a substantial portion of an airport's operating revenue may be derived from leases of property, for example to airlines and retail companies. In the past, most airports had limited facilities ("concessions") for airport travelers. These concession stands were usually badly overpriced and offered limited poor quality goods and services. In recent years, many airports such as the recently renovated and renamed Washington Reagan National Airport have created virtual shopping malls within the airport itself.

Airports have realized that air travelers are willing to spend money in airports on quality services and products, and moreover are unwilling to tolerate the high-priced and poor quality "concession stands" of the past. As such, airports have discovered they are sitting on valuable retail space, which can be leased for a generous profit. However, many airports may not be as comfortable with this new role as retail space landlord, and may be ill equipped to manage such retail leasing operations.

For a retailer operator in an airport, income may depend directly upon the number of flights (and passengers) travelling in and out of a particular gate or section of the airport. Thus, a lease for space in a busy portion of the airport terminal may be worth much more than one in a lesser-used portion of the airport. A retailer may be willing to pay more for retail space where it can be demonstrated that more passengers will be passing by. Similarly, a retailer may be less willing to pay top dollar for retail space in a lesser-used portion of the terminal. Quantifying actual passenger traffic and basing leasing prices for retail space based upon such traffic could optimize revenues for all portions of the airport.

More traditionally, airports have managed leasing of space to airlines for gates, ticket counters, and other space within the airport. Managing leasing of such space traditionally has relied upon flat fees for use of a particular space over a period of time. Traditional leasing techniques may not have correlated costs with income and usage. Gates that are not in use by one airline may sit vacant and could be leased to another airline on an as-needed basis. Tracking such use of airport facilities can be cumbersome and costly. It would be desirable to provide a system for dynamically tracking airport usage for leasing purposes.

An airline at the airport may receive invoices for rent as well as aircraft activity. This can be summarized as static and dynamic billing; where the airline receives bills for rental of space (static) and landing fees (dynamic). There are several existing packages on the market for management of leases at airports—or the static part of the equation. These existing programs include:

AirIT's Propworks (www.airit.com);
Aeroware, (http://www.aeroware.com/property.htm);
Airport Corporation of America, (http://www.airportweb.com);
Kelar (http://www.kelar.com/gis);
the Bowman Group (www.thebowmangroup.com/bgclients2.html); and
Maximo, (www.mrosoftware.co.nz/pdf/SydAir.pdf),
All of which are incorporated herein by reference.

An example of a typical standalone lease management system is described in Official Notice #6064, Invitation to Submit Proposal for Airport Property and Revenue Management Software System, published in February 2005 by General Mitchell International Airport, Milwaukee, Wis., and incorporated herein by reference. There are also solutions on the market aimed at capturing airport landing fees, such as Megadata's Passur (www.passur.com) and Lochard's SkyTrac (www.lochard.com), both of which are incorporated herein by reference.

Other relevant Megadata references include Published U.S. patent applications 20040243302, System and method to display operational and revenue data for an airport facility; 20040104824, Simplified flight track display system; 20040054550, System and method for the distribution of information during irregular operations; 20030009267, Apparatus and method for providing live display of aircraft flight information; and 20050021221, System and method for the correlation of multiple data feeds, all of which are incorporated herein by reference.

However, there are no comprehensive approaches that combine the static lease management with the dynamic aspects including landing fees, taxi usage, and overall facility usage including gates. Thus, it remains a requirement in the art to provide such a system.

When billing automation is introduced into a business, one of the main reasons is to improve the collection of revenue. A system that is more comprehensive in identifying usage may increase amounts collected. Costs may be reduced through automation and reduction of manually intensive activities. More accurate and automated client billing may reduce the cost to some clients, while increasing costs to other clients, but more importantly the system would provide detailed information on usage charges.

Most airports use unsophisticated methods to charge for airport usage. Peak time pricing is based on hourly blocks of time and client fees are assessed based on basic aircraft registration weight. Parking fees are usually charged to the nearest hour and ramp use fees are assessed based on the scheduled use of ramps at the airport. The reason for the approximations and basic rules is because existing (legacy) billing collection techniques are rudimentary and cannot support a more sophisticated set of rules.

With a more sophisticated system, the billing could be exact, and peak pricing could be based on actual landing time, parking time, ramp usage, type of ramp, and departure. Fees could be based on the specific aircraft weight for the individual aircraft, which would be equitable to users with different aircraft configurations. A system with this level of accuracy and fidelity would benefit the airport as well as the airport users. Users could have detailed information as feedback showing the billing accuracy and they could use this information to streamline their operations and planned use of the airport in peak and non-peak periods.

Increasingly sophisticated data feeds and the integration of multiple data streams allow an airport to get closer to the ideal billing methodology, one based on the economic cost of use. Every aircraft and passenger that arrives or departs an airport requires a certain amount of resources be available for that operation. Some aircraft require more resources than others based on their size, weight, and use (cargo vs. passengers). An ideal billing system would charge a fee based on the actual costs associated with accommodating that aircraft at that airport at that time.

For instance, an Airbus A380 will consume more of the airport's resources than a Canadair Regional Jet, but the difference in resources consumed by each of these two aircraft is only grossly approximated by the ratio of their maximum gross weights, which is how most billing systems are configured to charge landing fees. The Airbus carries over 500 people and may require that other gates be closed to accommodate the size of the large aircraft. These additional gates are then denied to other aircraft and have a cost associated with the lost opportunity, even if the Airbus was not using them. The lost opportunity cost represents an economic cost that should be recovered by the airport.

Thus, it remains a requirement in the art to provide an airport revenue management system which can track airport revenues and costs by determining the actual location, track, size, and type of aircraft travelling through the airport, as well as accurately tracking the number of passengers, amount of cargo, and the like, and to do so in an automated fashion, without relying unduly on manually entered data or self-reporting by airlines.

SUMMARY OF THE INVENTION

The system of the present invention acquires any and all data related to the operations, property, lease, and revenue management of an airport, including aircraft tracking data, and combines this data in a data fusion process to provide an accurate tracking of airport revenues and expenses. This data is then stored in a central database where it is processed, sorted, and stored for later retrieval. The data may exist in a number of forms including real-time streams, tabular, or in the form of a database. From this data, airport revenue information can be accurately managed.

The Data Acquisition Unit (DAU) acquires airport operation data. This system is designed to have a large number of channels of data flowing into it from conventional data sources, including manually entered data, data from other databases, aircraft tracking data, and other automated data entries relating to airport operation. The DAU acquires and assembles these multiple channels of data and forwards them to the data correlation and assembly unit (DCAU). The DAU is designed to work in real-time and has the capacity to acquire all the data available from any source. The output of the DAU is a single stream of un-correlated data.

The Data Correlation and Assembly Unit (DCAU) processes uncorrelated data. The DCAU system has software that simultaneously evaluates the multiple channels of data and prioritizes, filters, sorts, and assembles the data. Correlation includes the process of combing data elements for like events or occurrences. Thus, for example, airline schedule information, or self-reported schedule information may indicate when an aircraft is supposed to arrive at a gate, and how long the aircraft will be parked at the airport, but actual tracking data may provide more accurate data as to how long the aircraft was parked, what gate it arrived at, take-off weight of the aircraft, number of passengers, and the like. The system will use whichever data source is deemed to be most accurate, or whatever data source is available, to build a complete and accurate picture of airport operations.

Correlation also eliminates double reporting of the same event. Thus airline schedule information may be correlated with flight track information so that an airline flight is not reported as two flights if the flight is late or the like. This system readies the processed data for insertion into the data storage systems, the AirScene Data Warehouse (ADW). The output of the DCAU is a stream of data that is imported into a relational database by the ADW.

The AirScene Data Warehouse (ADW) is a relational database for storing the processed data. The ADW stores all of the data in an industry standard relational database and has sufficient capacity to respond in a timely fashion when queried. This database is accessed by a number of different processes and users including automated reporting engines, web-based query engines, user-initiated queries from software such as Access, Excel, Crystal reports, AirScene NOMS, AirScene Property and Revenue Management System, GIS, CAD, accounting, billing and other software tools. The ADW can be a stand-alone system or it can work in concert with other database servers to provide data and data services to the airport. The data flow for the ADW is bidirectional. Queries come into the ADW and those queries are processed and the results of the query are sent to the requester.

From the ADW, data on airport operations can be retrieved through manual inquiries via a user interface, or may be retrieved by other accounting software programs or packages through automated queries. Invoicing for airport operations, such as take-off and landing fees can be automated, and more accurately based upon actual takeoff weight, number of passengers on board, and the like. Actual passenger counts (enplanements) can be readily determined to qualify for government subsidies and also to assist in airport planning and operations. Leasing of gate space, as well as retail space, can be optimized based upon actual passenger traffic, as opposed to flat-rate fee schedules, passenger traffic projections, retail sales, or the like.

BRIEF DESCRIPTION OF THE DRAWINGS

FIG. 6 describes the data fields available from ASQP.

Figure 7:
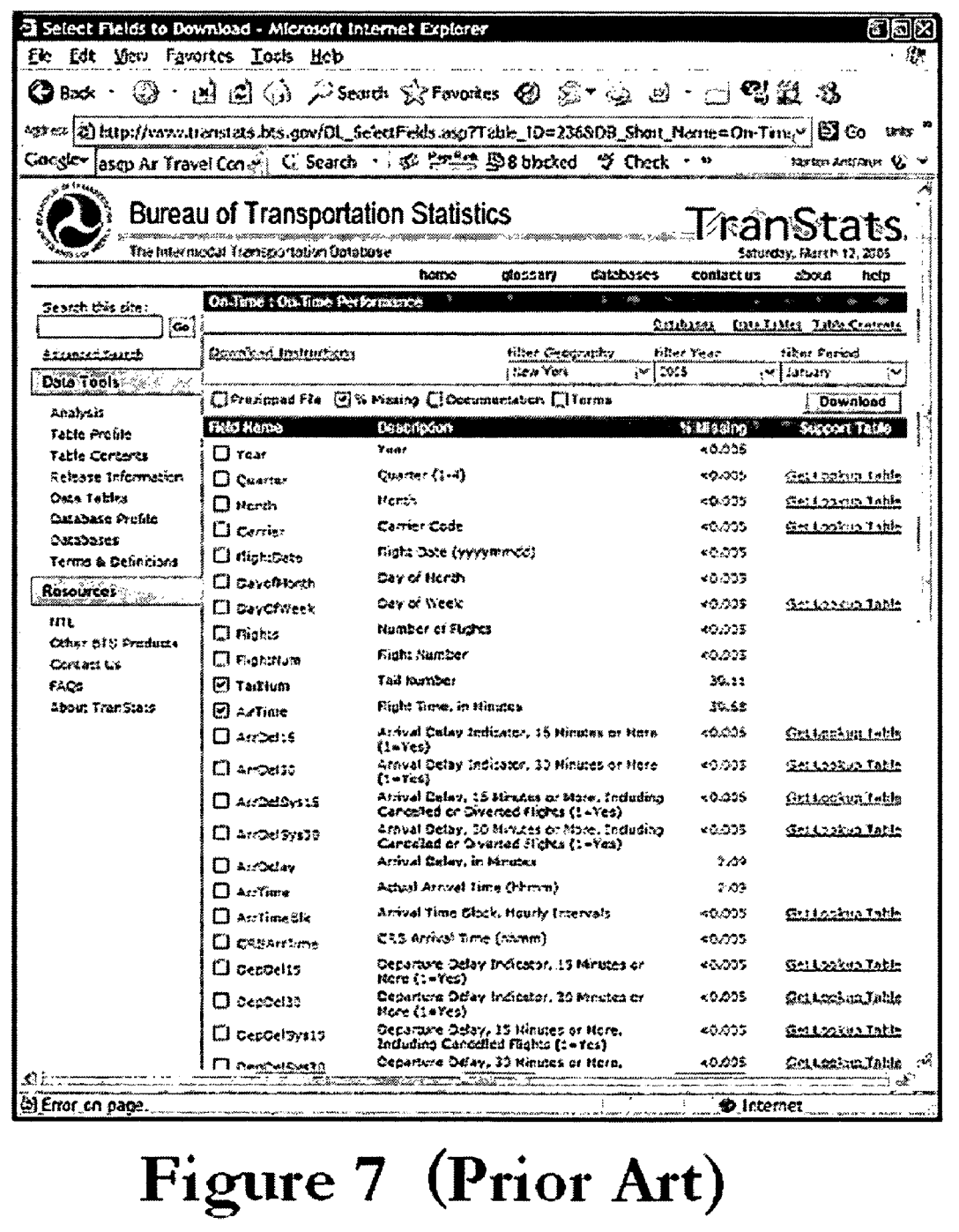

FIG. 7 is a screenshot of January 2005 statistics for the ASQP data from the Bureau of Transportation Statistics web site.

DETAILED DESCRIPTION OF THE INVENTION

Figure 1:
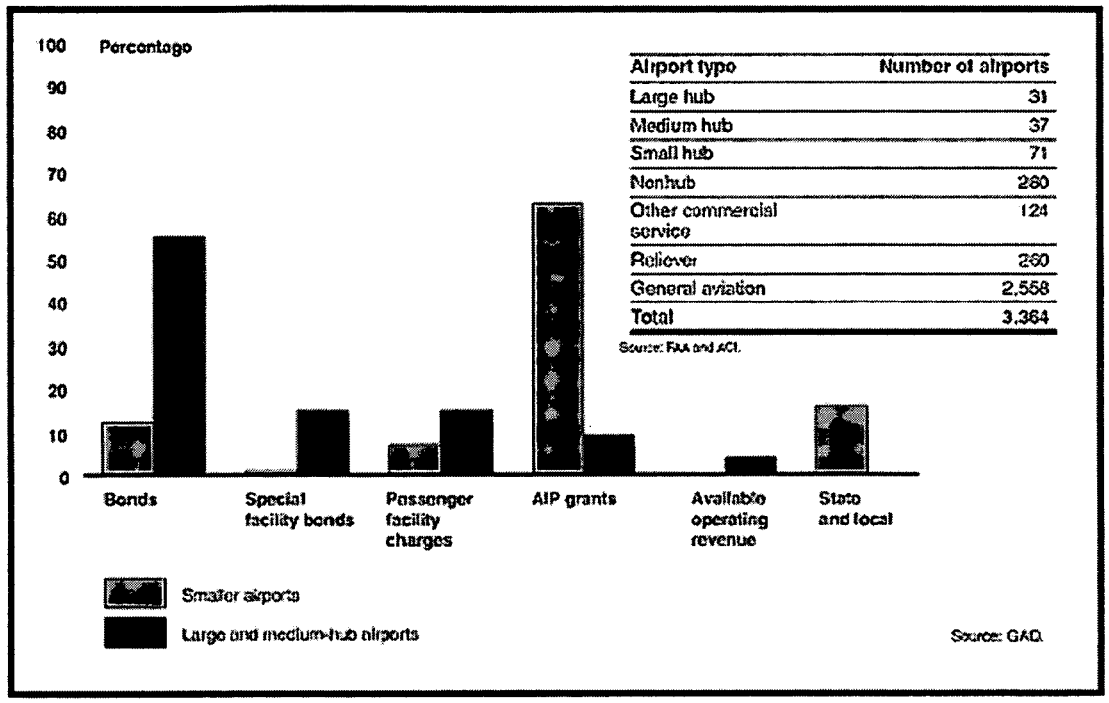
FIG. 1 is a chart illustrating how the amount and type of funding varies depending on airport size.
Figure 2:
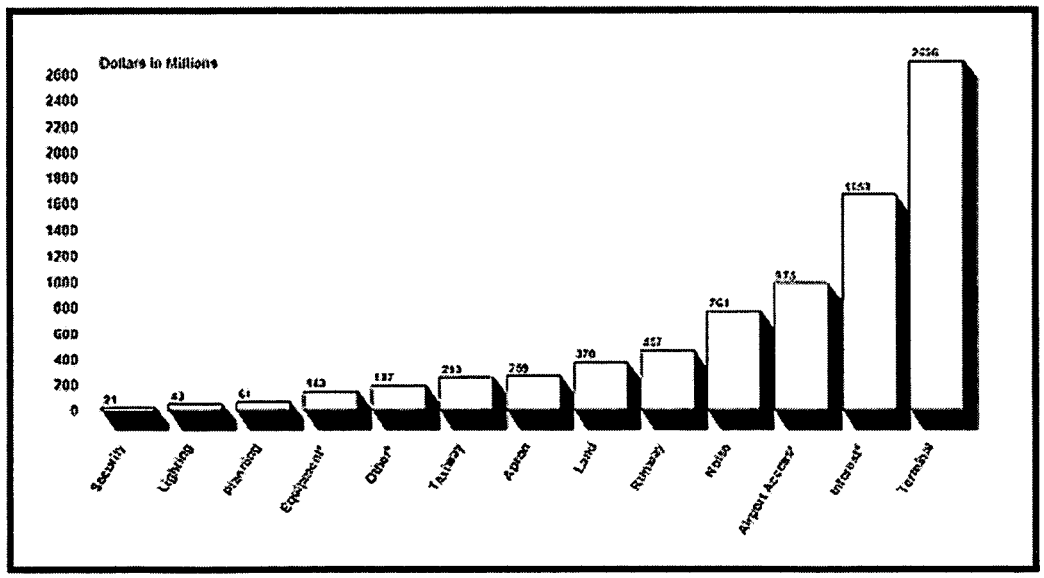
FIG. 2 is a chart compiled by the GAO, illustrating various types of airport projects financed through the PFC programs.
Figure 3:
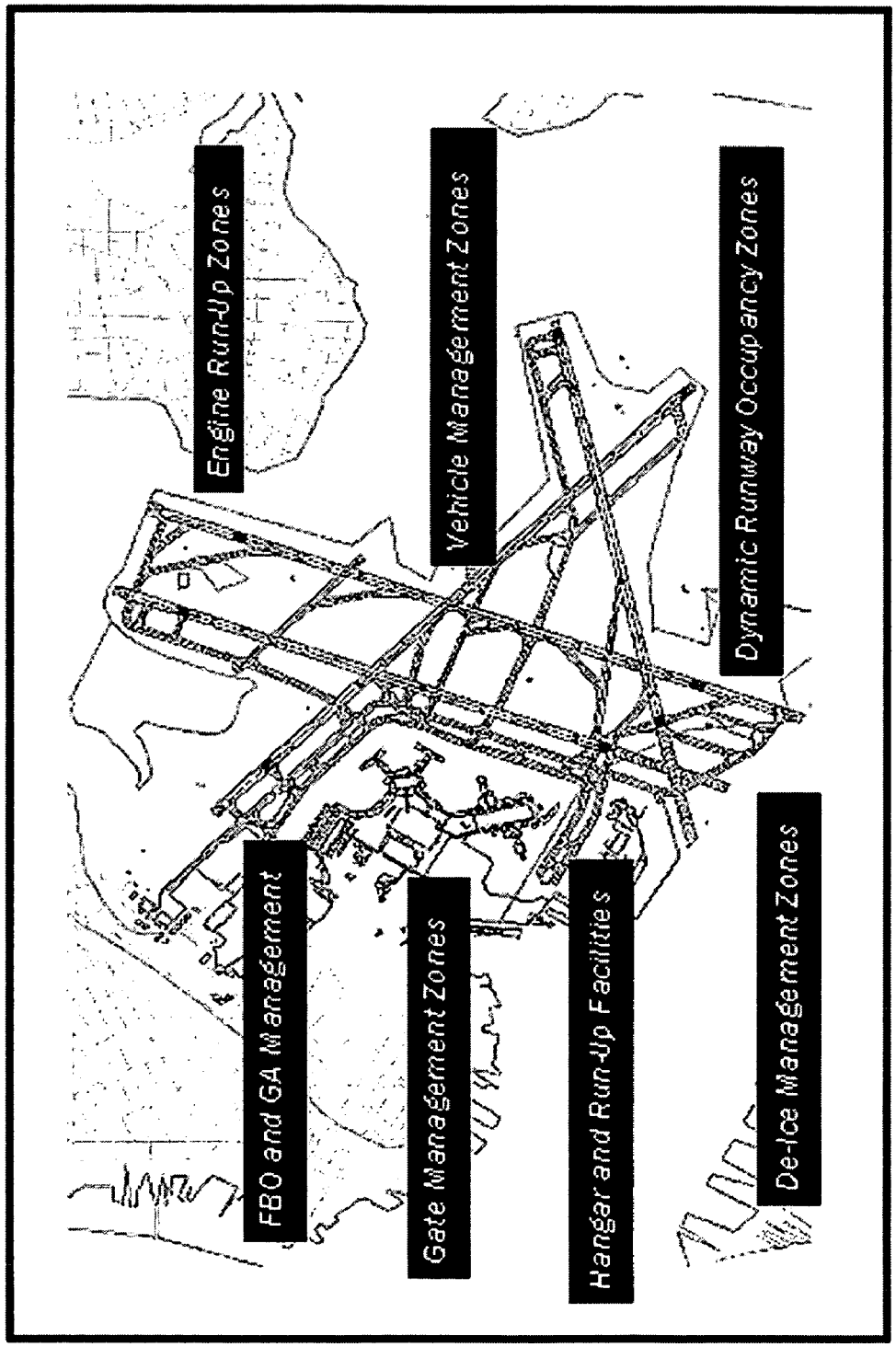
FIG. 3 illustrates one method of tracking aircraft using 2 D zones, in combination with airport GIS systems and accurate aircraft tracking and identification.
Figure 4:
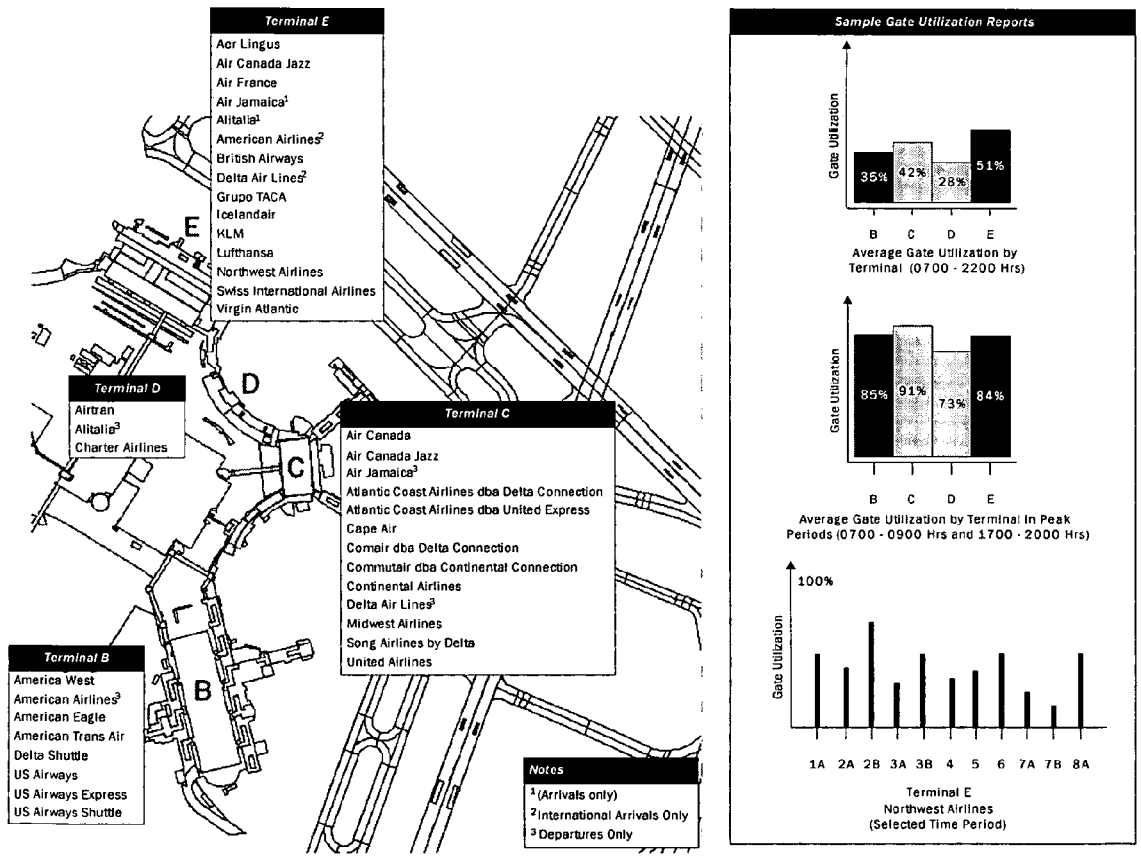
FIG. 4 is a diagram illustrating the Aerobahn system offered by Sensis Corporation of Dewitt, N.Y.
Figure 5:
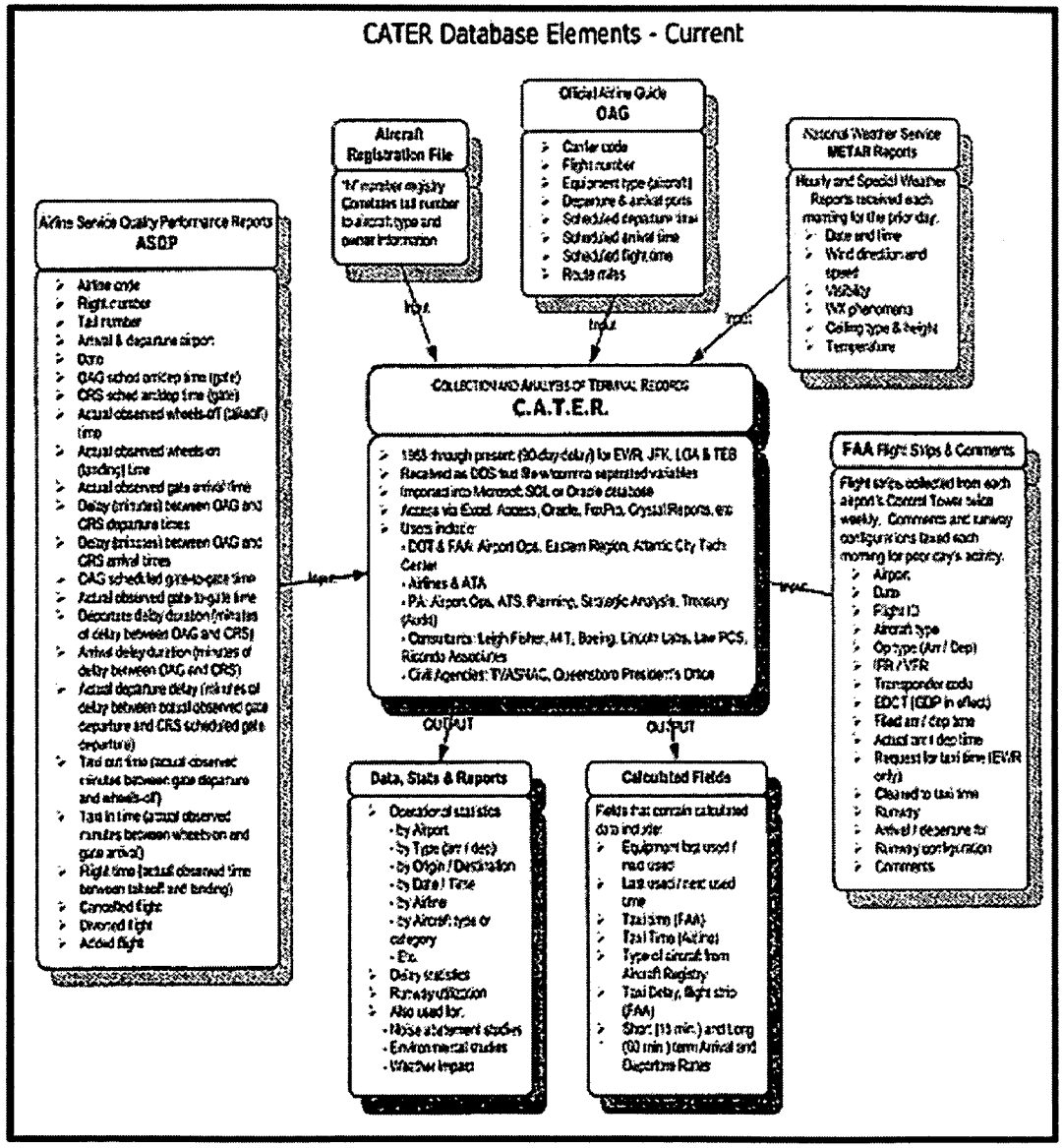
FIG. 5 is a block diagram illustrating an example of a Prior Art ASQP system in use at the Port Authority of New York and New Jersey.
Figure 8:
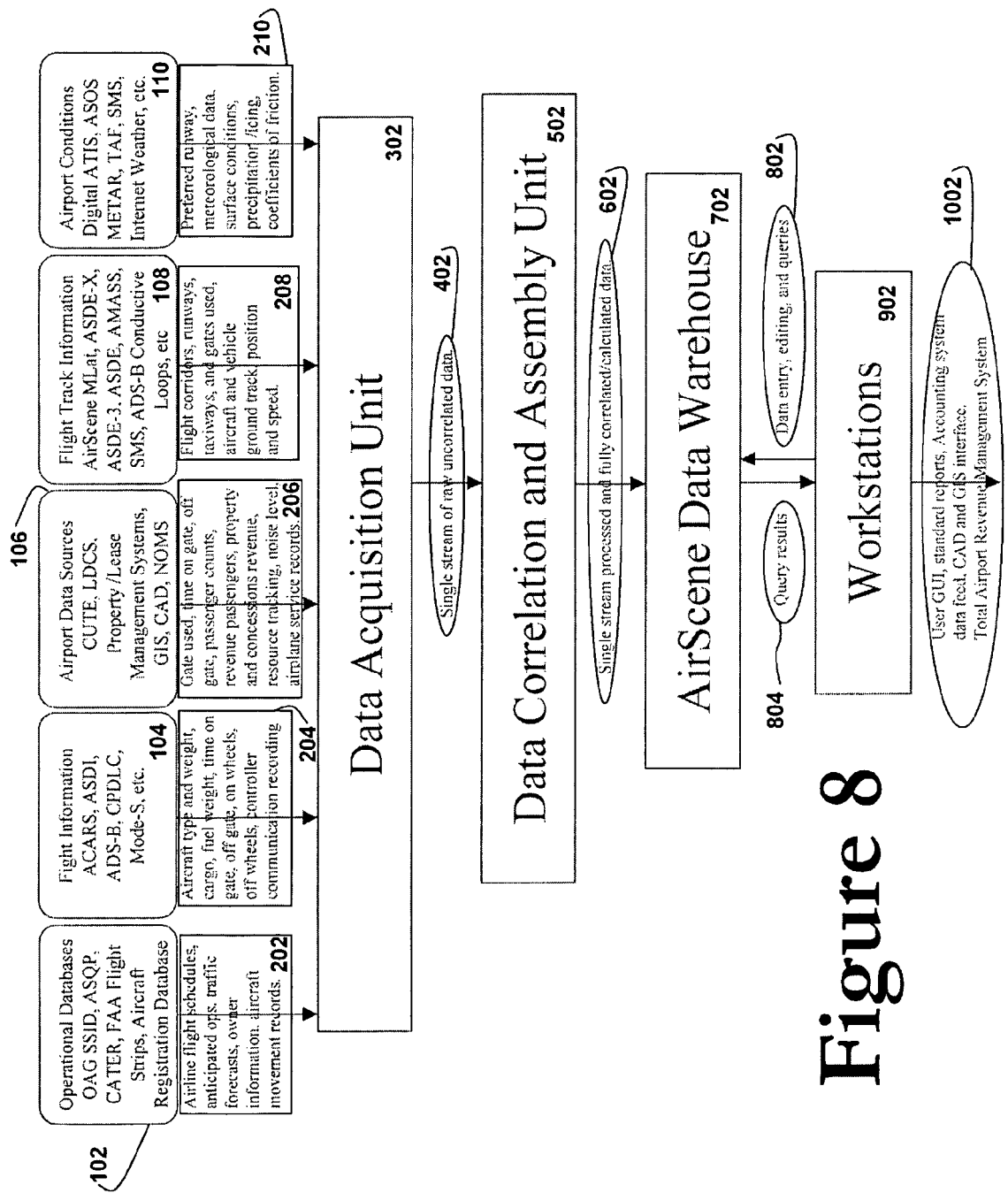
FIG. 8 is a diagram illustrating data flow through the AirScene system of the present invention.

FIG. 8 is a block diagram illustrating the major components of the AirScene™ Airport Revenue Management System and the types of data utilized by the system. The Air- Scene™ Airport Revenue Management System utilizes this data to quantify airport revenue and expenses based upon, in part, individual aircraft movement. This cumulative data allows AirScene™ to manage airport revenues. This information can be displayed through AirScene™ in the form of tables, graphs, or graphically represented on an airport diagram. Other programs, including 3rd party accounting software, may use the data from the AirScene™ system to more effectively manage airport income and expenses more effectively. Government agencies, the general public or other parties, may use the data to accumulate and analyze airport usage statistics and data, if desired. Such data may be published to a website or the like for public or government use, if desired.

Referring to FIG. 8, the system draws on data from the AirScene™ Data Warehouse (ADW) 702. DW 702 represents a single repository for all the information acquired from a number of different data sources. These data sources may include Operational Databases 102. Databases 102 may include the Official Airline Guides (OAG) databases, SSID (Supplemental Structural Inspection Document), the aforementioned ASQP system, the FAA CATER (Collection and Analysis of Terminal Records) system, FAA Flight Strips, and Aircraft Registration Database. Resultant data 202 from Operational Databases 102 may include airline flight schedules, future anticipated operations, owner information, aircraft movement records, and the like.

Databases 104 may include Flight Information and may include Aircraft Communication Addressing and Reporting Systems (ACARS) data, Aircraft Situation Display to Industry (ASDI), Automatic Dependent Surveillance—Broadcast (ASD-B), Controller-Pilot Datalink Communication (CP-DLC), Mode-S transponder data, and the like. This data generated from aircraft by radio signals may include relevant data 204 such as aircraft type and weight, cargo, fuel weight, time on gate, off gate, on wheels, off wheels, air traffic controller (ATC) communication recording, and the like. From this data, it is possible to determine aircraft weight, type, number of passengers, and other data relevant to airport revenue management. For example, number of passengers on each airplane can be collected to determine total number of enplanements for the airport.

Databases 106 may include Airport Data Sources, including Common Use Terminal Equipment (CUTE), Local Departure Control System (LDCS), (See, http://www.damarel.comlproducts/, incorporated herein by reference) Property/lease management systems, Geographic Information Systems (GIS), Computer Aided Design (CAD) data of airport terminals and facilities, Noise and Operations Monitoring System (NOMS), and the like. Databases 106 may produce data 206 such as gates used, time on gate, off gate, passenger counts, revenue passengers, property and concession revenues, resource tracking, noise levels, and aircraft service records. This airport information, for example, when correlated with other data, such as aircraft tracking data, can indicate which gate an aircraft is parked at, which runways were used, and the like.

Aircraft Multilateration Flight Tracking Systems 108 may comprise, for example, Rannoch Corporation's AirScene™ Mlat (Multilateration) system, which is capable of identifying and tracking aircraft both in the air and on the ground using multilateration of radio signals. Other aircraft tracking systems may also be used, including aircraft sensors mounted in taxiways and runways (e.g. conductive loops or the like) or other types of systems. Examples of such systems includes various models of Airport Surface Detection Equipment (ASDE), such as ASDE-X (see www.asdex.net, incorporated herein by reference), ASDE-3, and ASDE, as well as Airport Movement Area Safety System (AMASS), SITA Information Networking Computing (SITA INC), Short Messaging Service (SMS) (See, http://www.sita.aero/default.htm, incorporated herein by reference), the aforementioned ADS-B, and the like. Data 208 from such systems can produce actual aircraft positions or tracks (paths followed). Position and speed of aircraft can also be determined from such data. In addition, data 208 may include flight corridors, runways, taxiways, and gates used by aircraft, as determined from vehicle ground track, position and speed, along with other aircraft information and communications.

Other data sources 110 may describe airport conditions and may include digital ATIS (digital Automatic Terminal Information Service, see, http://www.arinc.com/products/voice_data_comm/d_atis/, incorporated herein by reference), Automated Surface Observation System (ASOS), METAR (Aviation Routine Weather Reports, available from the FAA and other sources), TAF (Terminal Aerodrome Forecast) the aforementioned SMS, Internet weather sources, and the like. These sources may produce data 210 indicating which runways are preferred, meteorological data, surface conditions, precipitation,/icing, coefficients of friction, and the like.

Note that all of the data sources 102, 104, 106, 108, and 110 do not need to be used in order to produce a satisfactory airport revenue tracking system. Some or all of these sources may be used, and/or additional sources of relevant data may also be applied. Each source of data may generate data, which may be relevant to airport revenue or expenses. Missing data may be filled in by other sources. In addition, data from different sources may be used to correlate data to increase accuracy of data reporting. For example, airport subsidies may be based upon enplanements (passengers loaded), which in the past may have been determined solely by manual reporting by airlines. The present invention may correlate that data (as set forth below) with passenger data from automated sources such as flight information 104.

Similarly, tracking gate usage and parking usage may have been a manual task relying upon self-reporting by airlines and/or manual reporting by air and ground traffic controllers or other airport personnel. Airlines may tend to underreport gate and parking usage, and airport personnel may be too busy with other jobs to accurately track such usage. The automated system of the present invention can track aircraft automatically and report down to the minute (or even second) where an aircraft is parked or particular gate usage. This data may be used to invoice airlines for airport services, as well as in planning gate usage. Similarly, landing fees can be more accurately based upon actual aircraft weight, passenger load, and use of airport facilities, rather than upon some flat-rate schedule. Thus, from the data sources described in FIG. 8, numerous useful data can be derived which may be useful to tracking airport revenue and expenses.

Data acquisition unit 302 acquires data 202, 204, 206, 208, and 210 from data sources 102, 104, 106, 108, and 110 to produce a single stream of raw uncorrelated data. The data acquired and stored by AirScene™ is the key to accurately tracking airport revenues and expenses. Data correlation and Assembly Unit 502 takes this stream of raw uncorrelated data and produces a single stream of fully correlated and calculated data 602. Correlation involves identifying which data elements represent the same or similar items (e.g., with regard to aircraft weight and track) and eliminating duplicate entries.

It is important that data from two sources indicating the track of the same aircraft are not counted as two aircraft tracks, otherwise, aircraft tracking data might be doubled, giving a false impression of actual airport traffic. Calculations may include weight calculations based upon aircraft weight (calculated from direct data, or inferred from aircraft type, cargo weight, fuel, and souls on board, or the like).

The Air Scene™ Data Warehouse 702 then stores this correlated and calculated data in a usable database. Workstations 902 connected to warehouse 702 may edit data or send queries 802 and receive results 804 which may be displayed 1002 in graphical, tabular, or visual form, illustrating aircraft revenue sources and income. The system can be interfaced with existing revenue management systems, and may also generate, in an automated fashion, invoices, checks, government forms, and the like to pay bills, invoice customers, and request subsidies based upon airport usage.

The AirScene™ Airport Revenue Management System can combine all the data sources into a single calculation of airport income and expenses. Historic data can also be accessed to make predictions about the future income and expense trends. Also, scheduled airline operations data from sources such as the Official Airline Guide (OAG), can be utilized to anticipate future airport operations for the purpose of calculating the future income and expenses. The OAG website database (see, www.oag.com) and other data includes data on aircraft weights, types, codes, and other aircraft, flight, airline, and schedule information.

In another alternative embodiment, a landing fee billing system may be implemented whose fees are based on the airport usage, including pavement wear. Aircraft known to place more stress on the pavement could be assessed higher landing fees to compensate the airport operator for the additional wear and tear. Aircraft weight can be readily determined by knowing aircraft type, souls on board, cargo weight, fuel weight, or even reported weight data (or even weight sensors embedded in pavement). Such a landing fee embodiment may be incorporated into the Rannoch Corporation Landing Fee system (described in the Patents and Pending Applications previously incorporated by reference) such that an aircraft owner can be automatically assessed a landing fee based upon aircraft weight, and billed accordingly.

The system and method of the present invention can thus be used to automatically calculate the amount of subsidies due from PCF and AIP grants based upon passenger throughput and/or cargo weight, based upon accurate data correlated from multiple sources.

In addition, the database created by the present invention can be used to audit other airport operations and systems to determine whether accurate data is being reported. For example, as noted previously, automobile parking is a substantial source of revenue for an airport. Yet many airports subcontract parking operations to one of a number of large parking companies who have an interest in underreporting parking revenues to the airport. Passenger throughput data can be used to audit parking revenues, as the number of cars parked will generally be proportional to overall passenger throughput.

Similarly, taxi surcharges and revenues can be audited based upon passenger throughput. Moreover, data for passengers entering taxis at the airport can be automated through the use of electronic data inputs at taxi stands and the like. Rental car company airport surcharges can be similarly input electronically, and/or monitored and audited using the system of the present invention. Rental car company databases may be queried by the system of the present invention and the data fed to the AirScene™ Data Warehouse.

The system may also be used for security purposes by authorized law enforcement authorities to track individual passenger flow through an airport. Data reported from a number of sources throughout the airport can track a passenger based upon check-in, security checkpoints, boarding operations, and even use of credit cards at airport concessions. In addition the use of RFID tags and other devices may be used to track passenger and baggage data for financial auditing and/or security purposes. Privacy concerns can be easily met by limiting access to the database regarding individual queries to authorized personnel.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A system for managing airport finances, comprising:
    a data acquisition unit receiving airport operations data from a plurality of sources, the plurality of sources including an automated aircraft tracking system receiving radio signals from aircraft and outputting path of movement data for aircraft in and around the airport as well as passenger and cargo data retrieved from the aircraft, the data acquisition unit outputting data from the received airport operations data;
    a data correlation unit receiving the airport operations data and processing the airport operations data to remove duplicate entries and outputting a single stream of processed airport operations data;
    a data warehouse receiving the processed airport operations data and storing the processed airport operations data in a predetermined database format; and
    an interface automatically interfacing with the data warehouse to retrieve and output processed data from the database the total number of passengers passing through an airport and landed cargo weight for the predetermined time period and calculates a Federal Airport Improvement Program (AIP) grant entitlement for the airport.

2. The system of claim 1, wherein the data correlation unit calculates, from the airport operations data, airport operation parameters comprising one or more of: number of passengers enpianed at an airport; number of landings at an airport; number of takeoffs at an airport; amount of cargo shipped through an airport; time spent by aircraft at a gate; time spent by aircraft parked; weight of a landing aircraft; weight of a aircraft taking off; track of aircraft; aircraft type; number of passengers passing through an airport; and traffic flow of passengers through an airport.

3. The system of claim 2, wherein the interface receives database queries from a user automatically outputs airport operations data in tabular or graphical form in response to such queries.

4. The system of claim 2, wherein the interface interfaces with financial accounting software to receive data queries from such software and automatically outputs airport operations data to the financial accounting software in response to such queries.

5. A system for managing airport finances, comprising:
    a data acquisition unit receiving airport operations data from a plurality of sources, the plurality of sources including an automated aircraft tracking system receiving radio signals from aircraft and outputting path of movement data for aircraft in and around the airport as well as passenger and cargo data retrieved from the aircraft, the data acquisition unit outputting data from the received airport operations data;
    a data correlation unit receiving the airport operations data and processing the airport operations data to remove duplicate entries and outputting a single stream of processed airport operations data including a number of passengers and landed cargo weight at the airport for a particular aircraft,
a data warehouse receiving the processed airport operations data and storing the processed airport operations data in a predetermined database format; and
an interface automatically interfacing with the data warehouse to retrieve processed data indicating number of passengers and landed cargo weight at the airport for a particular aircraft, calculate landing weight of the particular aircraft based on at least number of passengers, landed cargo weight, and standard aircraft weight and generate a landing fee invoice based upon calculate weight of the particular aircraft.

6. A system for managing airport finances, comprising:
a data acquisition unit receiving airport operations data from a plurality of sources, the plurality of sources including an automated aircraft tracking system receiving radio signals from aircraft and outputting path of movement data for aircraft in and around the airport including individual aircraft path at the airport, the data acquisition unit outputting data from the received airport operations data;
a data correlation unit receiving the airport operations data and processing the airport operations data to remove duplicate entries and outputting a single stream of processed airport operations data including individual aircraft path data;
a data warehouse receiving the processed airport operations data and storing the processed airport operations data in a predetermined database format; and
an interface automatically interfacing with the data warehouse to automatically retrieve processed data indicating path of individual aircraft, calculate an amount of time spent by an individual aircraft at a gate and generate an invoice for gate fees for the individual aircraft based upon time spent at a gate by the individual aircraft.

7. A system for managing airport finances, comprising:
a data acquisition unit receiving airport operations data from a plurality of sources, the plurality of sources including an automated aircraft tracking system receiving radio signals from aircraft and outputting path of movement data for aircraft in and around the airport including individual aircraft path at the airport, the data acquisition unit outputting data from the received airport operations data;
a data correlation unit receiving the airport operations data and processing the airport operations data to remove duplicate entries and outputting a single stream of processed airport operations data;
a data warehouse receiving the processed airport operations data and storing the processed airport operations data in a predetermined database format; and
an interface automatically interfacing with the data warehouse to retrieve and processed data indicating path of individual aircraft, calculate an amount of time spent by an individual aircraft parked, and generate an invoice for parking fees for an individual aircraft based upon amount of time spent by the individual aircraft parked.

8. A system for managing airport finances, comprising:
a data acquisition unit receiving airport operations data from a plurality of sources, the plurality of sources including an automated aircraft tracking system receiving radio signals from individual aircraft and outputting path of movement data for individual aircraft in and around the airport as well as passenger data retrieved from the individual aircraft, the data acquisition unit outputting data from the received airport operations data;
a data correlation unit receiving the airport operations data and processing the airport operations data to remove duplicate entries and outputting a single stream of processed airport operations data;
a data warehouse receiving the processed airport operations data and storing the processed airport operations data in a predetermined database format; and
an interface automatically interfacing with the data warehouse to automatically retrieve and output processed data including path of movement data for aircraft and passenger data retrieved from individual aircraft to calculate passenger pedestrian flow through the airport and generate an invoice for a retail space lessee for rent based at least in part upon passenger flow near the retail space.

9. A system for managing airport finances, comprising:
a data acquisition unit receiving airport operations data from a plurality of sources, the plurality of sources including an automated aircraft tracking system receiving radio signals from aircraft and outputting path of movement data for aircraft in and around the airport, the data acquisition unit outputting data from the received airport operations data;
a data correlation unit receiving the airport operations data and processing the airport operations data to remove duplicate entries and outputting a single stream of processed airport operations data;
a data warehouse receiving the processed airport operations data and storing the processed airport operations data in a predetermined database format; and
an interface automatically interfacing with the data warehouse to automatically retrieve and output processed data including path of movement data for aircraft retrieved from individual aircraft to determine at least one of aircraft type and aircraft track for the individual aircraft and generating an invoice for gate services based upon at least one of aircraft type and aircraft track.

10. A system for managing airport finances, comprising:
a data acquisition unit receiving airport operations data from a plurality of sources, the plurality of sources including an automated aircraft tracking system receiving radio signals from aircraft and outputting path of movement data for aircraft in and around the airport as well as passenger and cargo data retrieved from the aircraft, the data acquisition unit outputting data from the received airport operations data;
a data correlation unit receiving the airport operations data and processing the airport operations data to remove duplicate entries and outputting a single stream of processed airport operations data;
a data warehouse receiving the processed airport operations data and storing the processed airport operations data in a predetermined database format; and
an interface automatically interfacing with the data warehouse to automatically retrieve processed data including path of movement data for aircraft and passenger data retrieved from individual aircraft to calculate a number of passengers passing through the airport and calculating and outputting Passenger Facility Charges to an airline based on passenger throughput from individual aircraft.

11. An automated method for managing airport finances, comprising
tracking vehicle movement using an automated aircraft tracking system, the automated aircraft tracking system receiving radio signals from aircraft and outputting movement data of aircraft in and around the airport as well as passenger and cargo data retrieved from the aircraft;

receiving in a data acquisition unit coupled to the automated aircraft movement tracking system, airport operations data including aircraft movement tracking data including path of movement data for aircraft aircraft, and number of passengers and amount of landed cargo on tracked aircraft;

outputting from the data acquisition unit, the airport operations data including number of passengers and amount of landed cargo on tracked aircraft;

automatically correlating the airport operations data in a correlation unit to remove duplicate entries and outputting a single stream of processed data;

storing the processed data in a data warehouse in a predetermined database format; and automatically interfacing with the data warehouse to retrieve processed data indicating number of passengers passing through an airport and landed cargo weight, automatically totaling the number of passengers passing through the airport for a given time period by adding together the number of passengers for individual tracked aircraft for a given time period, automatically totaling the amount of landed cargo at the airport for a given time period by adding together the landed cargo for individual tracked aircraft for the given time period, and automatically calculating and outputting an amount of a Federal Airport Improvement Program (AIP) grant entitlement amount for the airport based on number of passengers passing through an airport and landed cargo weight at the airport for a given time period.

12. The method of claim 11, wherein correlating the data in a correlation unit to remove duplicate entries and outputting a single stream of processed data further comprises calculating, from the airport operations data, airport operation parameters comprising one or more of: number of passengers enplaned at an airport; number of landings at an airport; number of take-offs at an airport; amount of cargo shipped through an airport; time spent by aircraft at a gate; time spent by aircraft parked; weight of a landing aircraft; weight of a aircraft taking off; track of aircraft; aircraft type; number of passengers passing through an airport; and traffic flow of passengers through an airport.

13. The method of claim 12, wherein the step of interfacing comprises the steps of receiving database queries from a user and automatically outputting airport operations data in tabular or graphical form in response to such queries.

14. The method of claim 12, wherein the step of interfacing comprises the steps of interfacing with financial accounting software and receiving data queries from such software and automatically outputting airport operations data to the financial accounting software in response to such queries.

15. A method for managing airport finances, comprising the steps of:

receiving in a data acquisition unit, airport operations data from a plurality of sources, the plurality of sources including an automated aircraft tracking system receiving radio signals from aircraft and outputting path of movement data for aircraft in and around the airport as well as passenger and cargo data retrieved from the aircraft;

outputting from the data acquisition unit, airport operations data from the received airport operations data including a number of passengers and landed cargo weight at the airport for a particular aircraft;

correlating the airport operations data in a correlation unit to remove duplicate entries and outputting a single stream of processed data;

storing the processed data in a data warehouse in a predetermined database format; and automatically interfacing with the data warehouse to retrieve processed data indicating number of passengers and landed cargo weight at the airport for a particular aircraft, calculate landing weight of the particular aircraft based on at least number of passengers, landed cargo weight, and standard aircraft weight and generate a landing fee invoice based upon calculated weight of the particular aircraft weigh.

16. A method for managing airport finances, comprising the steps of:

receiving in a data acquisition unit, airport operations data from a plurality of sources, the plurality of sources including an automated aircraft tracking system receiving radio signals from aircraft and outputting path of movement data for aircraft in and around the airport including individual aircraft path at the airport;

outputting from the data acquisition unit, airport operations data from the received airport operations data including individual aircraft path data;

correlating the airport operations data in a correlation unit to remove duplicate entries and outputting a single stream of processed data;

storing the processed data in a data warehouse in a predetermined database format; and automatically interfacing with the data warehouse to retrieve processed data indicating path of individual aircraft calculate an amount of time spent by an individual aircraft at a gate and generate an invoice for gate fees for the individual aircraft based upon time spent at a gate by the individual aircraft.

17. A method for managing airport finances, comprising the steps of:

receiving in a data acquisition unit, airport operations data from a plurality of sources, the plurality of sources including an automated aircraft tracking system receiving radio signals from aircraft and outputting path of movement data for aircraft in and around the airport as well as passenger and cargo data retrieved from the aircraft;

outputting from the data acquisition unit, airport operations data from the received airport operations data including a number of passengers and landed cargo weight at the airport for a particular aircraft;

correlating the airport operations data in a correlation unit to remove duplicate entries and outputting a single stream of processed data;

storing the processed data in a data warehouse in a predetermined database format; and automatically interfacing with the data warehouse to retrieve processed data processed data indicating path of individual aircraft, calculate an amount of time spent by an individual aircraft parked and generate an invoice for parking fees for an individual aircraft based upon amount of time spent by the individual aircraft parked.

18. A method for managing airport finances, comprising the steps of:

receiving in a data acquisition unit, airport operations data from a plurality of sources, the plurality of sources including an automated aircraft tracking system receiving radio signals from aircraft and outputting path of movement data for aircraft in and around the airport as well as passenger and cargo data retrieved from the aircraft;

outputting from the data acquisition unit, airport operations data from the received airport operations data including a number of passengers and landed cargo weight at the airport for a particular aircraft, correlating the airport operations data in a correlation unit to remove duplicate entries and outputting a single stream of processed data;

storing the processed data in a data warehouse in a predetermined database format; and automatically interfacing with the data warehouse to retrieve processed data from the database format to manage airport finances, wherein the step of interfacing comprises the steps of automatically receiving processed data including path of movement data for aircraft and passenger data retrieved from individual aircraft to calculate passenger pedestrian flow through the airport and generating an invoice for a retail space lessee for rent based at least in part upon passenger flow near thr retail space.

19. A method for managing airport finances, comprising the steps of:

receiving in a data acquisition unit, airport operations data from a plurality of sources, the plurality of sources including an automated aircraft tracking system receiving radio signals from aircraft and outputting path of movement data for aircraft in and around the airport;

outputting from the data acquisition unit, airport operations data from the received airport operations data including a number of passengers and landed cargo weight at the airport for a particular aircraft, correlating the airport operations data in a correlation unit to remove duplicate entries and outputting a single stream of processed data;

storing the processed data in a data warehouse in a predetermined database format; and automatically interfacing with the data warehouse to retrieve processed data from the database format to manage airport finances, wherein the step of interfacing comprises the steps of receiving processed data including path of movement data for aircraft retrieved from individual aircraft to determine at least one of aircraft type and aircraft track, and generating an invoice for gate services for the individual aircraft based upon at least one of aircraft type and aircraft track.

20. A method for managing airport finances, comprising the steps of:

receiving in a data acquisition unit, airport operations data from a plurality of sources, the plurality of sources including an automated aircraft tracking system receiving radio signals from aircraft and outputting path of movement data for aircraft in and around the airport as well as passenger and cargo data retrieved from the aircraft;

outputting from the data acquisition unit, airport operations data from the received airport operations data including a number of passengers and landed cargo weight at the airport for a particular aircraft;

correlating the airport operations data in a correlation unit to remove duplicate entries and outputting a single stream of processed data;

storing the processed data in a data warehouse in a predetermined database format; and automatically interfacing with the data warehouse to retrieve processed data from the database format to manage airport finances, wherein the step of interfacing comprises the steps of receiving processed data including path of movement data for aircraft and passenger data retrieved from individual aircraft to calculate a number of passengers passing through the airport, the method further comprising the step of:

automatically calculating and outputting Passenger Facility Charges to an airline based on passenger throughput from individual aircraft.

* * * * *